United States Patent
Liu et al.

(10) Patent No.: US 12,212,101 B2
(45) Date of Patent: Jan. 28, 2025

(54) MATING TERMINAL MODULE, MATING BACKPLANE CONNECTOR, AND BACKPLANE CONNECTOR ASSEMBLY WITH IMPROVED IMPEDANCE STABILIZATION

(71) Applicant: DONGGUAN LUXSHARE TECHNOLOGIES CO., LTD, Dongguan (CN)

(72) Inventors: Xiaogang Liu, Dongguan (CN); Rongzhe Guo, Dongguan (CN); Kun Liu, Dongguan (CN)

(73) Assignee: DONGGUAN LUXSHARE TECHNOLOGIES CO., LTD, Dongguan (CN)

( * ) Notice: Subject to any disclaimer, the term of this patent is extended or adjusted under 35 U.S.C. 154(b) by 339 days.

(21) Appl. No.: 17/857,689

(22) Filed: Jul. 5, 2022

(65) Prior Publication Data
US 2023/0052801 A1 Feb. 16, 2023

(30) Foreign Application Priority Data
Aug. 16, 2021 (CN) .......................... 202110936789.1

(51) Int. Cl.
*H01R 13/6474* (2011.01)
*H01R 12/73* (2011.01)
(Continued)

(52) U.S. Cl.
CPC ....... *H01R 13/6474* (2013.01); *H01R 12/737* (2013.01); *H01R 13/518* (2013.01); *H01R 13/6587* (2013.01)

(58) Field of Classification Search
CPC ............ H01R 13/6587; H01R 13/6586; H01R 13/6474; H01R 13/518; H01R 13/65807;
(Continued)

(56) References Cited

U.S. PATENT DOCUMENTS

| | | | | |
|---|---|---|---|---|
| 8,764,483 B2 * | 7/2014 | Ellison | ............... | H01R 13/6587 439/607.07 |
| 9,022,806 B2 * | 5/2015 | Cartier, Jr. | ......... | H01R 13/6587 439/607.07 |

(Continued)

FOREIGN PATENT DOCUMENTS

CN 209200202 U 8/2019
CN 111682367 A 9/2020
(Continued)

*Primary Examiner* — Gary F Paumen
(74) *Attorney, Agent, or Firm* — Birch, Stewart, Kolasch & Birch, LLP

(57) ABSTRACT

A mating terminal module includes a number of mating conductive terminals. Each mating conductive terminal includes a mating portion. The mating conductive terminals include a first mating signal terminal and a second mating signal terminal. The first mating signal terminal further includes a first connecting portion. The second mating signal terminal further includes a second connecting portion. The first connecting portion extends in a direction toward the second connecting portion, and the second connecting portion extends in a direction toward the first connecting portion. The present disclosure also discloses a mating backplane connector and a backplane connector assembly having the mating terminal module. Compared with the prior art, the present disclosure can achieve a better effect of impedance stabilization.

20 Claims, 29 Drawing Sheets

(51) Int. Cl.
*H01R 13/518* (2006.01)
*H01R 13/6587* (2011.01)

(58) Field of Classification Search
CPC ... H01R 13/514; H01R 12/737; H01R 23/688
USPC .............................. 439/752, 607.06, 607.07
See application file for complete search history.

(56) References Cited

U.S. PATENT DOCUMENTS

| | | | |
|---|---|---|---|
| 11,600,953 B2* | 3/2023 | Song | H01R 13/40 |
| 2005/0009402 A1* | 1/2005 | Chien | H01R 12/716 |
| | | | 439/607.13 |
| 2013/0065441 A1* | 3/2013 | Yang | H01R 31/08 |
| | | | 439/607.34 |
| 2014/0073173 A1* | 3/2014 | Yang | H01R 13/6461 |
| | | | 439/485 |
| 2015/0079821 A1* | 3/2015 | Pao | H01R 13/6587 |
| | | | 439/108 |
| 2015/0236451 A1 | 8/2015 | Cartier, Jr. et al. | |
| 2016/0240976 A1* | 8/2016 | Tamai | H01R 13/6467 |
| 2020/0287332 A1* | 9/2020 | Chen | H01R 13/6586 |
| 2021/0098939 A1* | 4/2021 | Wu | H01R 13/6595 |
| 2021/0399462 A1 | 12/2021 | Song et al. | |

FOREIGN PATENT DOCUMENTS

| | | |
|---|---|---|
| CN | 111682368 A | 9/2020 |
| CN | 111864478 A | 10/2020 |
| CN | 213878627 U | 8/2021 |
| CN | 213878826 U | 8/2021 |
| TW | 202040891 A | 11/2020 |
| TW | 202044690 A | 12/2020 |
| TW | 202109986 A | 3/2021 |
| TW | 202130056 A | 8/2021 |

* cited by examiner

MATING TERMINAL MODULE, MATING BACKPLANE CONNECTOR, AND BACKPLANE CONNECTOR ASSEMBLY WITH IMPROVED IMPEDANCE STABILIZATION

CROSS-REFERENCE TO RELATED APPLICATION

This patent application claims priority of a Chinese Patent Application No. 202110936789.1, filed on Aug. 16, 2021 and titled "MATING TERMINAL MODULE, MATING BACKPLANE CONNECTOR, AND BACKPLANE CONNECTOR ASSEMBLY", the entire content of which is incorporated herein by reference.

TECHNICAL FIELD

The present disclosure relates to a mating terminal module, a mating backplane connector and a backplane connector assembly, which belongs to a technical field of connectors.

BACKGROUND

Existing backplane connector assembly usually includes a backplane connector and a mating backplane connector which are mateable with each other. Both the backplane connector and the mating backplane connector include a header and a plurality of terminal modules mounted on the header. Each terminal module includes an insulating frame, a plurality of conductive terminals insert-molded in the insulating frame, and a metal shield installed on at least one side of the insulating frame. The conductive terminals generally include several groups of differential signal terminals and a plurality of ground terminals located on both sides of each group of differential signal terminals. Each group of differential signal terminals usually includes a first signal terminal and a second signal terminal.

Since the backplane connector and the mating backplane connector may have multiple states when they are mated, how to ensure that the backplane connector and the mating backplane connector can achieve the effect of impedance stabilization is a technical problem to be solved by those skilled in the art.

SUMMARY

An object of the present disclosure is to provide a mating terminal module, a mating backplane connector and a backplane connector assembly that can achieve the effect of impedance stabilization.

In order to achieve the above object, the present disclosure adopts the following technical solution: a mating terminal module, including: a plurality of mating conductive terminals, each mating conductive terminal including a mating portion and an intermediate portion, the mating conductive terminals including mating differential signal terminals, a first mating ground terminal and a second mating ground terminal, the mating differential signal terminals being located between the first mating ground terminal and the second mating ground terminal, the mating differential signal terminals including a first mating signal terminal and a second mating signal terminal; and an insulating support frame, the intermediate portions of the mating conductive terminals being fixed to the insulating support frame, the insulating support frame including a hollow portion, the intermediate portions of the mating conductive terminals being partially exposed to the hollow portion; wherein the first mating signal terminal further includes a first connecting portion connecting the mating portion of the first mating signal terminal and the intermediate portion of the first mating signal terminal; and wherein the mating portion and the first connecting portion of the first mating signal terminal protrude beyond the insulating support frame; wherein the second mating signal terminal further includes a second connecting portion connecting the mating portion of the second mating signal terminal and the intermediate portion of the second mating signal terminal; and wherein the mating portion and the second connecting portion of the second mating signal terminal protrude beyond the insulating support frame; and wherein the first connecting portion extends from one end of the mating portion of the first mating signal terminal toward the second connecting portion; and the second connecting portion extends from one end of the mating portion of the second mating signal terminal toward the first connecting portion.

In order to achieve the above object, the present disclosure adopts the following technical solution: a mating backplane connector, including: a mating header, the mating header including a mating surface and a plurality of terminal receiving grooves extending through the mating surface; and a plurality of mating terminal modules, the mating terminal modules being assembled to the mating header, each mating terminal module including: a plurality of mating conductive terminals, each mating conductive terminal including a mating portion and an intermediate portion, the mating conductive terminals including mating differential signal terminals, a first mating ground terminal and a second mating ground terminal, the mating differential signal terminals being located between the first mating ground terminal and the second mating ground terminal, the mating differential signal terminals including a first mating signal terminal and a second mating signal terminal; and an insulating support frame, the intermediate portions of the mating conductive terminals being fixed to the insulating support frame, the insulating support frame including a hollow portion, the intermediate portions of the mating conductive terminals being partially exposed to the hollow portion; wherein the first mating signal terminal further includes a first connecting portion connecting the mating portion of the first mating signal terminal and the intermediate portion of the first mating signal terminal; and wherein the mating portion and the first connecting portion of the first mating signal terminal protrude beyond the insulating support frame; wherein the second mating signal terminal further includes a second connecting portion connecting the mating portion of the second mating signal terminal and the intermediate portion of the second mating signal terminal; and wherein the mating portion and the second connecting portion of the second mating signal terminal protrude beyond the insulating support frame; and wherein the first connecting portion extends from one end of the mating portion of the first mating signal terminal toward the second connecting portion; and the second connecting portion extends from one end of the mating portion of the second mating signal terminal toward the first connecting portion.

In order to achieve the above object, the present disclosure adopts the following technical solution: a backplane connector assembly, including: a backplane connector, including: a header, the header defining a receiving space; and a plurality of terminal modules, the terminal modules being assembled to the header, each terminal module including: a plurality of conductive terminals, each conductive terminal including a contact portion and a connection portion, the conductive terminals including differential signal terminals, a first ground terminal and a second ground terminal, the differential signal terminals being located between the first ground terminal and the second ground terminal; an insulating frame, the connection portions of the conductive terminals being fixed to the insulating frame, the insulating frame including a hollow portion, the connection portions of the conductive terminals being partially exposed to the hollow portion; an insulating block, the insulating block being sleeved on the contact portion of the first signal terminal and the contact portion of the second signal terminal; and a metal shield surrounding member, the metal shield surrounding member being sleeved on the insulating block, the metal shield surrounding member including a protrusion formed inwardly; and a mating backplane connector mateable with the backplane connector, the mating backplane connector including: a mating header, the mating header including a mating surface and a terminal receiving groove extending through the mating surface, the mating header being at least partially received in the receiving space, the metal shield surrounding member being inserted into the terminal receiving groove; and a plurality of mating terminal modules, the mating terminal modules being assembled to the mating header, each mating terminal module including: a plurality of mating conductive terminals, each mating conductive terminal including a mating portion and an intermediate portion, the mating conductive terminals including mating differential signal terminals, a first mating ground terminal and a second mating ground terminal, the mating differential signal terminals being located between the first mating ground terminal and the second mating ground terminal, the mating differential signal terminals including a first mating signal terminal and a second mating signal terminal; and an insulating support frame, the intermediate portions of the mating conductive terminals being fixed to the insulating support frame, the insulating support frame including a hollow portion, the intermediate portions of the mating conductive terminals being partially exposed to the hollow portion; wherein the first mating signal terminal further includes a first connecting portion connecting the mating portion of the first mating signal terminal and the intermediate portion of the first mating signal terminal; and wherein the mating portion and the first connecting portion of the first mating signal terminal protrude beyond the insulating support frame; wherein the second mating signal terminal further includes a second connecting portion connecting the mating portion of the second mating signal terminal and the intermediate portion of the second mating signal terminal; and wherein the mating portion and the second connecting portion of the second mating signal terminal protrude beyond the insulating support frame; and wherein the first connecting portion extends from one end of the mating portion of the first mating signal terminal toward the second connecting portion; and the second connecting portion extends from one end of the mating portion of the second mating signal terminal toward the first connecting portion.

Compared with the prior art, by providing the first recess and the second recess, the present disclosure can maintain a distance between the mating conductive terminal and the protrusion of the backplane connector within an appropriate value range, regardless of when the mating backplane connector and the backplane connector are plugged in place or plugged but not in place. As a result, the effect of impedance stabilization of the present disclosure can be achieved.

DETAILED DESCRIPTION

Figure 1:
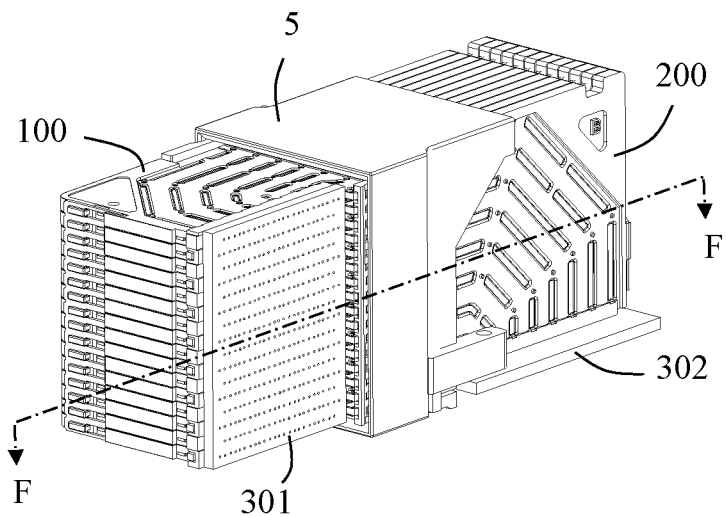
FIG. 1 is a perspective view of a backplane connector assembly in accordance with an embodiment of the present disclosure.

Exemplary embodiments will be described in detail here, examples of which are shown in drawings. When referring to the drawings below, unless otherwise indicated, same numerals in different drawings represent the same or similar elements. The examples described in the following exemplary embodiments do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms "a", "said", and "the" used in this application and the appended claims are also intended to include plural forms unless the context clearly indicates other meanings.

It should be understood that the terms "first", "second" and similar words used in the specification and claims of this application do not represent any order, quantity or importance, but are only used to distinguish different components. Similarly, "an" or "a" and other similar words do not mean a quantity limit, but mean that there is at least one; "multiple" or "a plurality of" means two or more than two. Unless otherwise noted, "front", "rear", "lower" and/or "upper" and similar words are for ease of description only and are not limited to one location or one spatial orientation. Similar words such as "include" or "comprise" mean that elements or objects appear before "include" or "comprise" cover elements or objects listed after "include" or "comprise" and their equivalents, and do not exclude other elements or objects. The term "a plurality of" mentioned in the present disclosure includes two or more.

Hereinafter, some embodiments of the present disclosure will be described in detail with reference to the accompanying drawings. In the case of no conflict, the following embodiments and features in the embodiments can be combined with each other.

Figure 2:
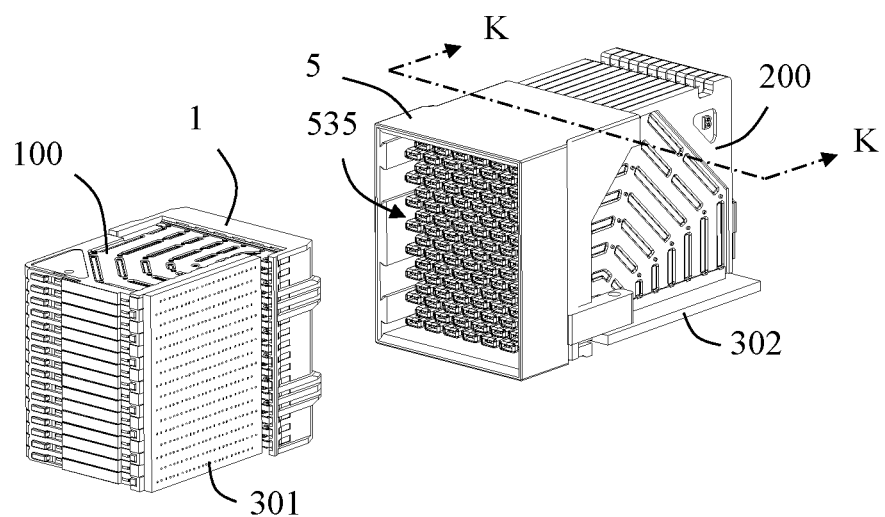
FIG. 2 is a partially exploded perspective view of FIG. 1.

Referring to FIGS. 1 and 2, the present disclosure discloses a backplane connector assembly including a backplane connector 200, a mating backplane connector 100 mateable with the backplane connector 200, a first circuit board 302 mounted with the backplane connector 200, and a second circuit board 301 mounted with the mating backplane connector 100. In the illustrated embodiment of the present disclosure, the backplane connector 200 and the mating backplane connector 100 are mated in an orthogonal manner. The second circuit board 301 is perpendicular to the first circuit board 302.

Figure 3:
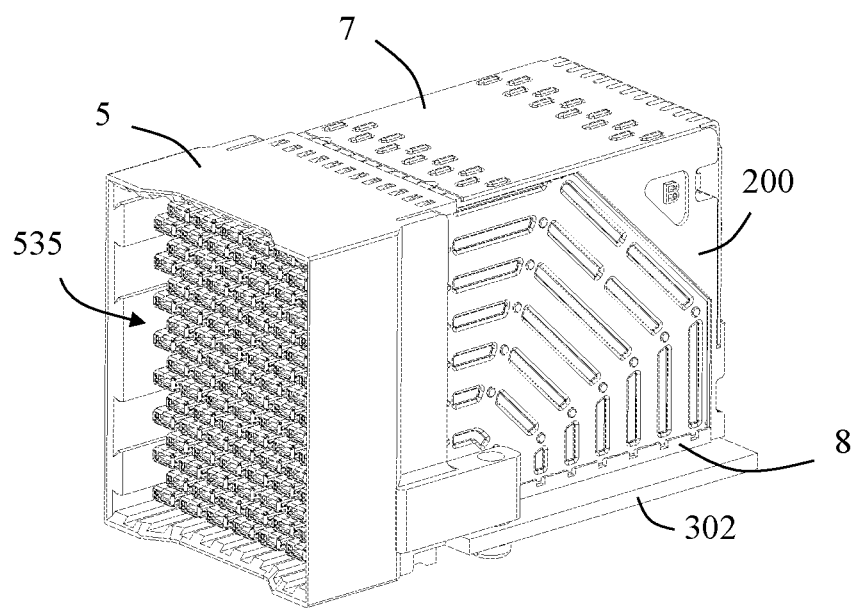
FIG. 3 is a perspective schematic view of a backplane connector installed on a first circuit board in accordance with an embodiment of the present disclosure.

Referring to FIG. 3, in the illustrated embodiment of the present disclosure, the backplane connector 200 is fixed to the first circuit board 302 by a bolt 303. The backplane connector 200 is adapted for mating with the mating backplane connector 100 for high-speed data transmission.

Figure 4:
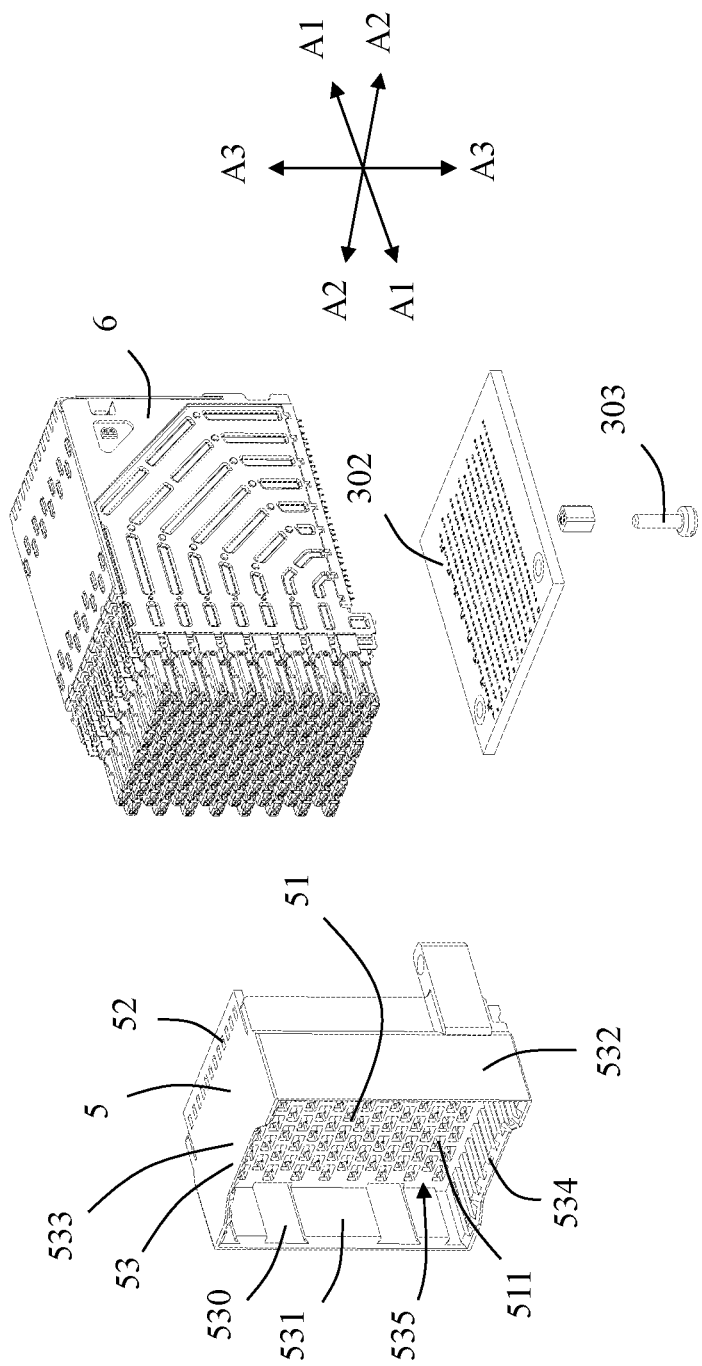
FIG. 4 is a partially exploded perspective view of FIG. 3.
Figure 5:
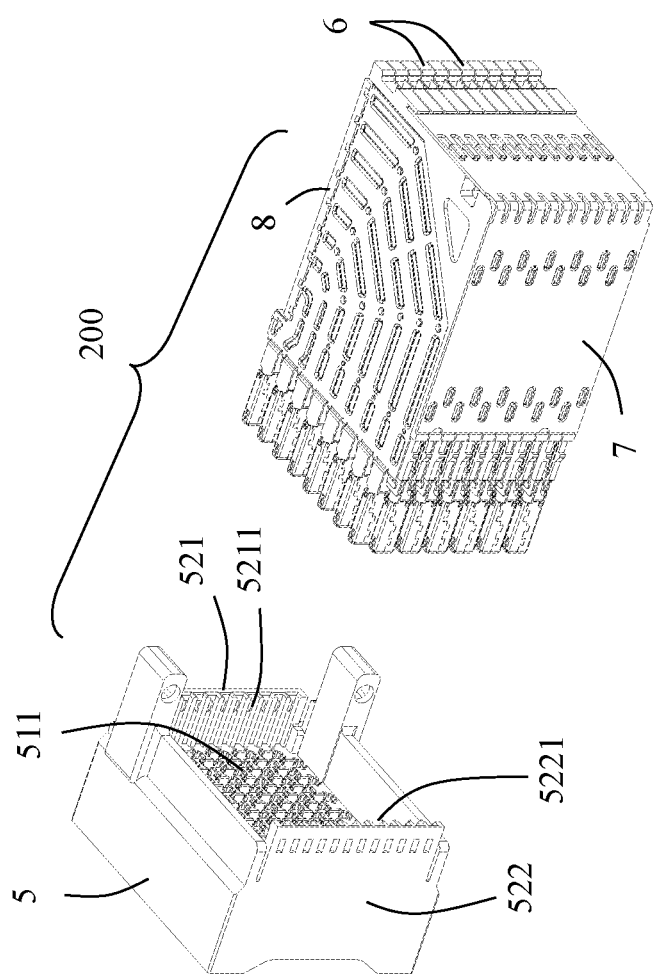
FIG. 5 is a partial perspective exploded view of the backplane connector in FIG. 4 from another angle.

Referring to FIGS. 4 and 5, the backplane connector 200 includes a header 5, a plurality of terminal modules 6 assembled to the header 5, a spacer 7 holding on one side of the plurality of terminal modules 6, and a mounting block 8 holding the other side of the plurality of terminal modules 6.

Figure 6:
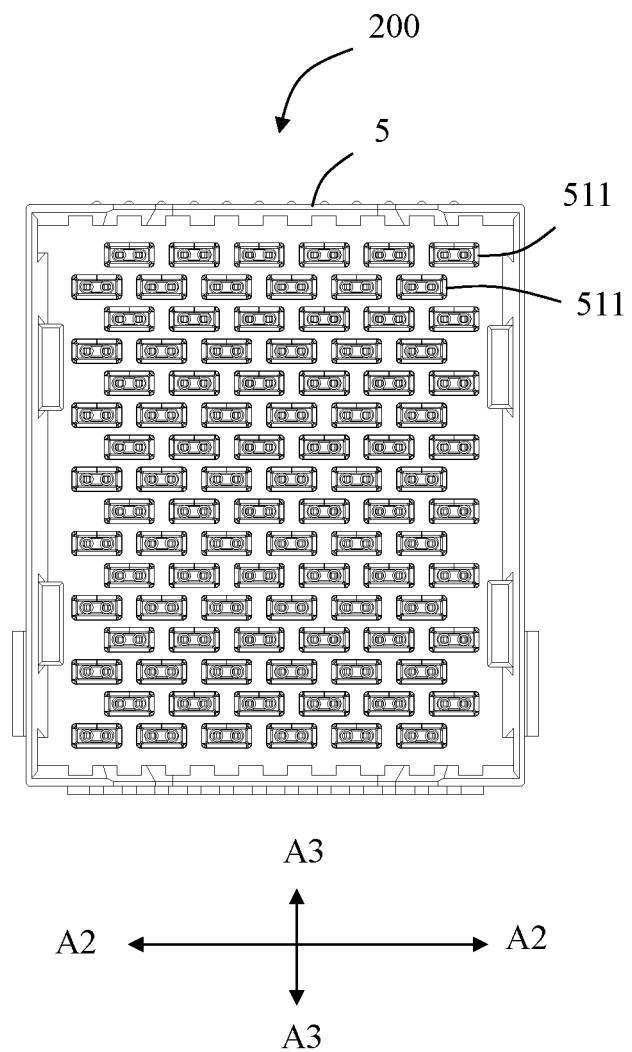
FIG. 6 is a front view of the backplane connector in FIG. 3.
Figure 7:
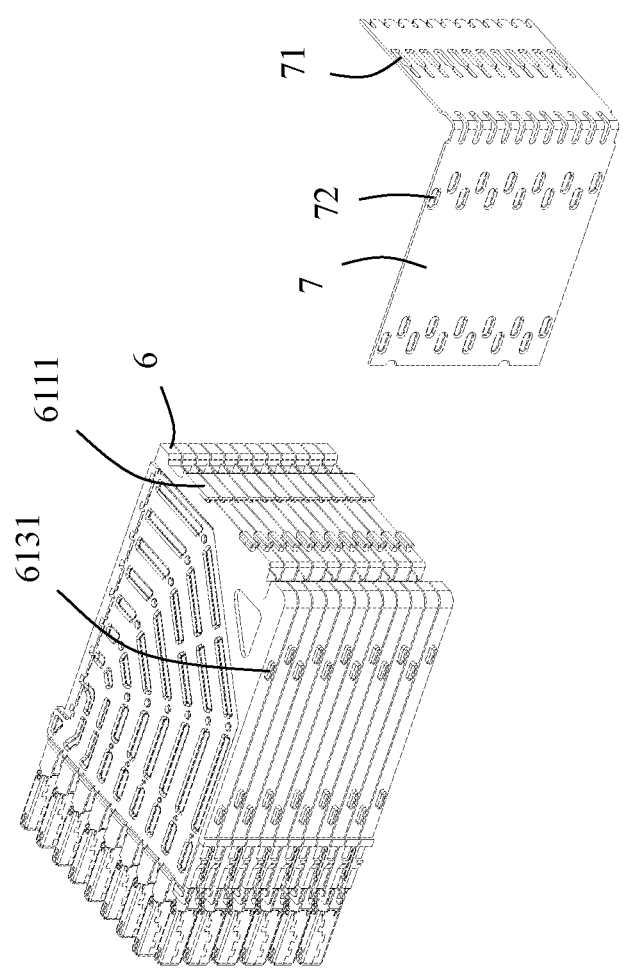
FIG. 7 is a partial perspective exploded view of the backplane connector after removing a header in FIG. 5, in which a spacer is separated.
Figure 8:
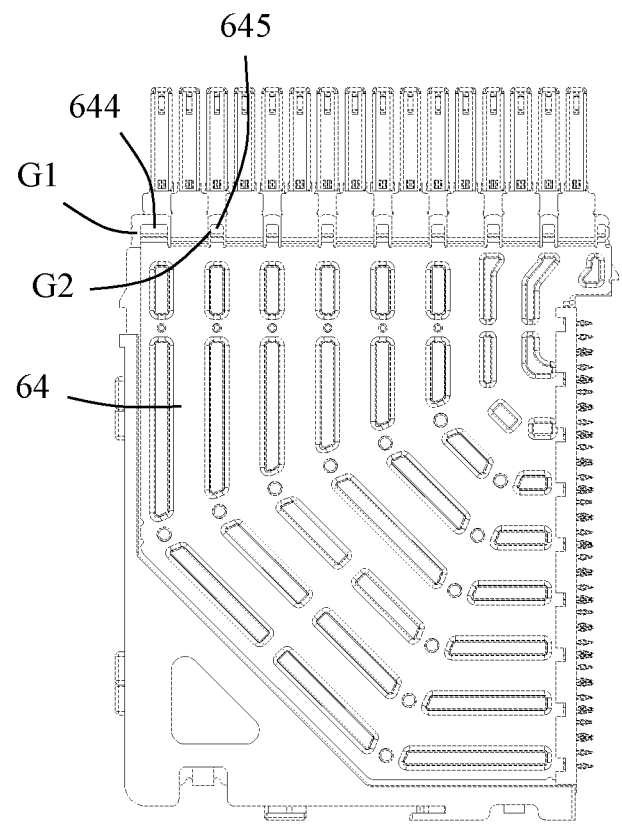
FIG. 8 is a side view of a terminal module of the backplane connector.
Figure 9:
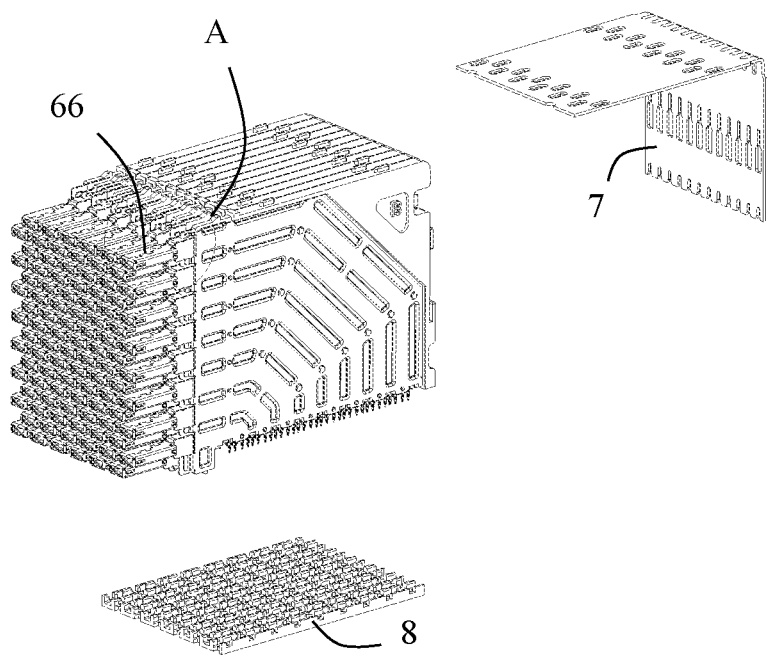
FIG. 9 is a partial perspective exploded view of the backplane connector from another angle.

The header 5 is made of insulating material. The header 5 includes a body portion 51, a wall portion 52 extending from the body portion 51 to one end (for example, extending forwardly), and a frame portion 53 extending from the body portion 51 to the other end (for example, extending rearwardly). The body portion 51 includes a plurality of terminal receiving grooves 511 extending along a first direction A1-A1 (for example, a front-rear direction). Referring to FIG. 6, in the illustrated embodiment of the present disclosure, the terminal receiving grooves 511 are disposed in multiple rows along a second direction A2-A2 (for example, a left-right direction). Two adjacent rows of terminal receiving grooves 511 are staggered in a third direction A3-A3 (for example, a top-bottom direction). That is, in two adjacent rows of the terminal receiving grooves 511, the terminal receiving grooves 511 at corresponding positions are not in alignment with each other in the second direction A2-A2. The wall portion 52 includes a first wall portion 521 and a second wall portion 522 disposed opposite to each other. The first wall portion 521 includes a plurality of first slots 5211. The second wall portion 522 includes a plurality of second slots 5221. The first slot 5211 and the second slot 5221, which are in alignment with each other, together with the terminal receiving groove 511 corresponding to the first slot 5211 and the second slot 5221 are jointly used for receiving the same terminal module 6.

The frame portion 53 includes a first extension wall 531, a second extension wall 532 opposite to the first extension wall 531, a top wall 533 connecting one end of the first extension wall 531 and one end of the second extension wall 532, a bottom wall 534 connecting the other end of the first extension wall 531 and the other end of the second extension wall 532, and a receiving space 535 jointly enclosed by the first extension wall 531, the second extension wall 532, the top wall 533 and the bottom wall 534. The receiving space 535 is used for at least partially accommodating the mating backplane connector (not shown). Specifically, in the illustrated embodiment of the present disclosure, both the first extension wall 531 and the second extension wall 532 include a plurality of positioning grooves 530 in order to improve the mating accuracy of the mating backplane connector and the backplane connector 200.

Referring to FIGS. 7 to 12, each terminal module 6 includes an insulating frame 61, a plurality of conductive terminals 62 insert-molded with the insulating frame 61, a first metal shield 63 fixed on one side of the insulating frame 61, and a second metal shield 64 fixed on the other side of the insulating frame 61.

Figure 12:
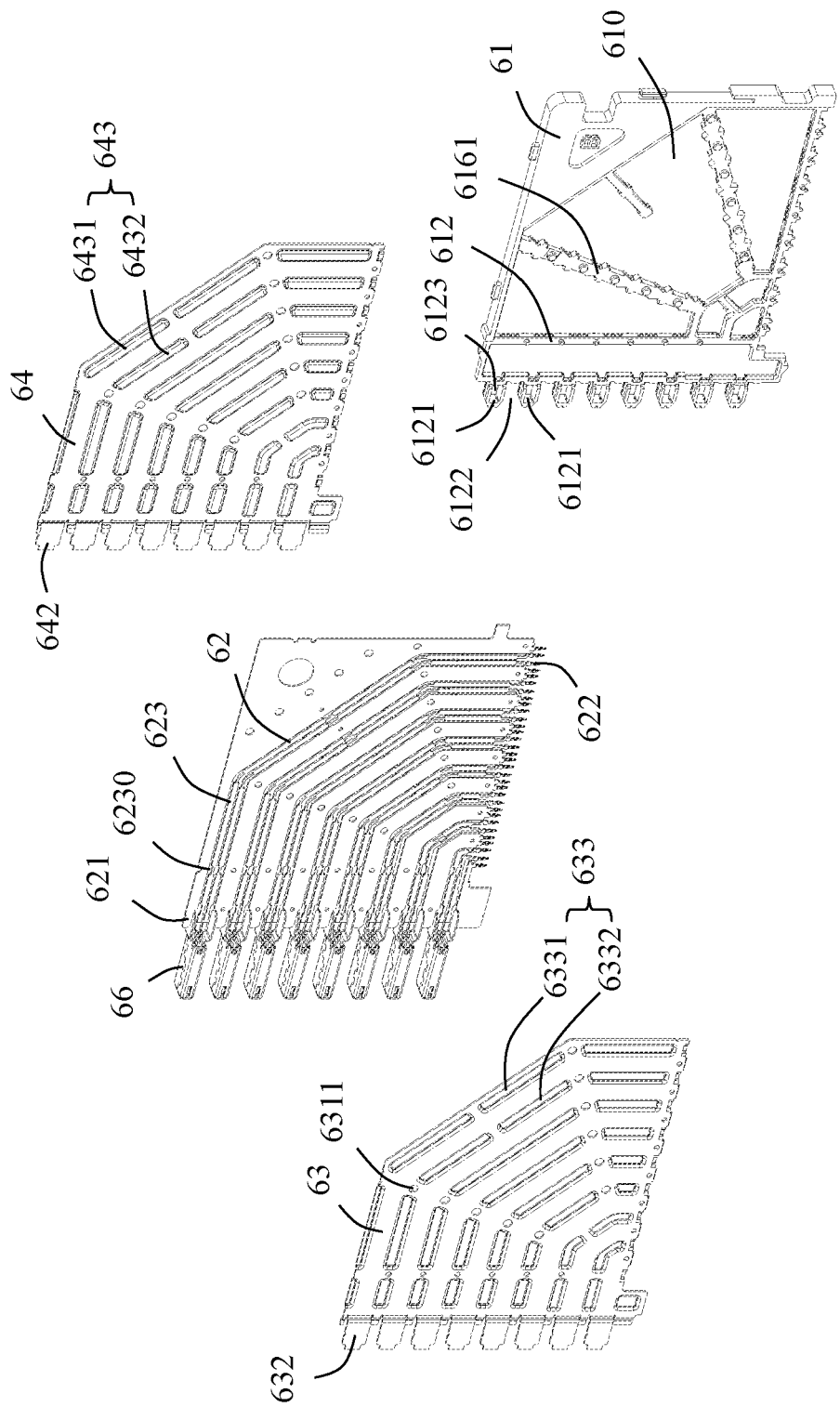
FIG. 12 is a partially exploded perspective view of FIG. 11.
Figure 15:
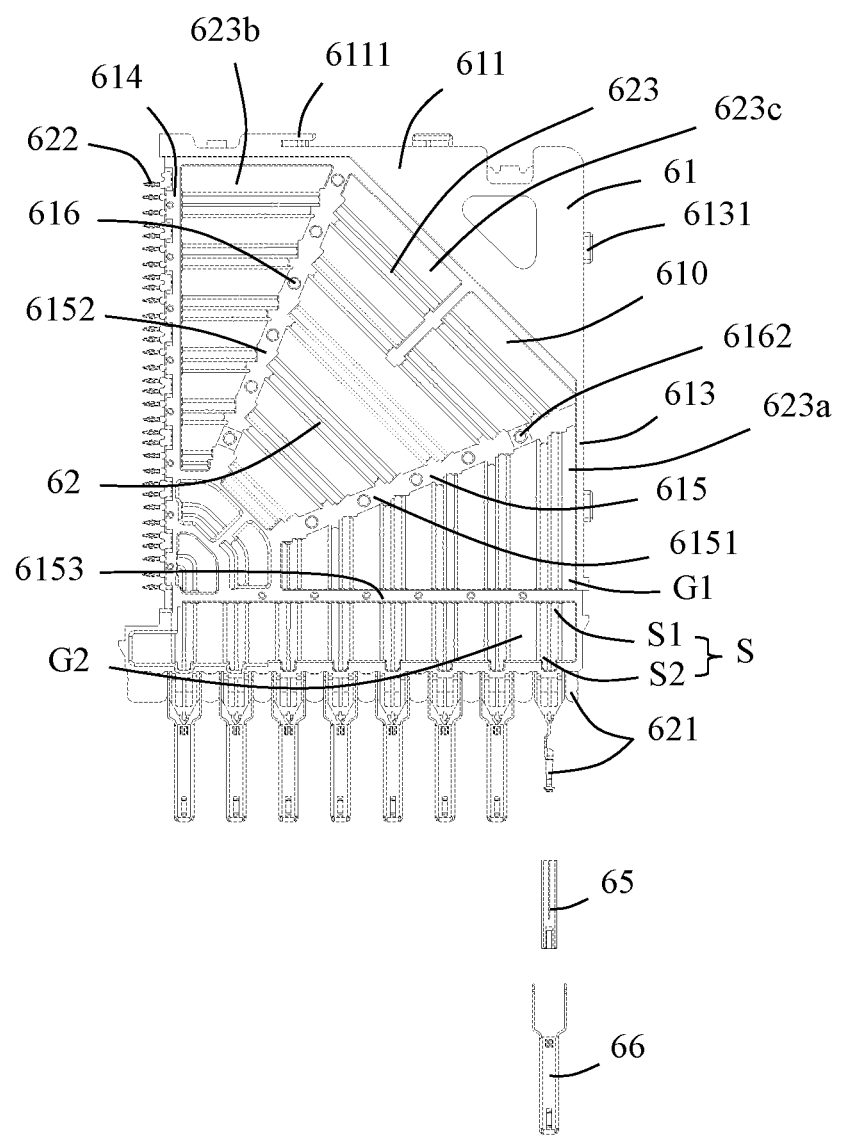
FIG. 15 is a side view of FIG. 11 after the first metal shield and the second metal shield are removed, in which a metal shield surrounding member and an insulating block are separated.

Referring to FIGS. 12 and 15, the insulating frame 61 is roughly frame-shaped. Each insulating frame 61 includes a rear wall 611, a front wall 612 opposite to the rear wall 611, a top wall 613 connecting one end of the rear wall 611 and one end of the front wall 612, a bottom wall 614 connecting the other end of the rear wall 611 and the other end of the front wall 612, and a plurality of connecting walls 615. The connecting walls 615 can enhance the structural strength of the frame. The rear wall 611 includes a first protrusion 6111. The top wall 613 includes a second protrusion 6131. Referring to FIG. 5, the spacer 7 is roughly L-shaped and includes a plurality of first slots 71 and a plurality of second slots 72 for holding the first protrusions 6111 and the second protrusions 6131, respectively. With this arrangement, each terminal module 6 can be formed as a whole by providing the spacer 7. In the illustrated embodiment of the present disclosure, the insulating frame 61 includes a hollow portion 610. The connecting walls 615 include a first connecting wall 6151 connecting the top wall 613 and the bottom wall 614, and a second connecting wall 6152 connecting the rear wall 611 and the bottom wall 614. The first connecting wall 6151 and the second connecting wall 6152 are exposed in the hollow portion 610. The first connecting wall 6151 and the second connecting wall 6152 are disposed obliquely. One ends of the first connecting wall 6151 and the second connecting wall 6152 are adjacent to each other, and the other ends are spread out so as to form a radial shape. The connecting walls 615 also includes a reinforcing wall 6153 connecting the top wall 613 and the bottom wall 614 and parallel to the front wall 612.

Referring to FIGS. 12 and 15, the front wall 612 includes a plurality of protruding blocks 6121 disposed at intervals and a groove 6122 located between two adjacent protruding blocks 6121. The protruding block 6121 includes an opening 6123 to partially expose corresponding conductive terminal 62 in order to adjust the impedance.

The insulating frame 61 further includes a plurality of posts 616 for fixing and positioning the first metal shield 63 and the second metal shield 64. In the illustrated embodiment of the present disclosure, the posts 616 are substantially cylindrical-shaped. In the illustrated embodiment of the present disclosure, the posts 616 are disposed on the bottom wall 614, the first connecting wall 6151 and the second connecting wall 6152. The first metal shield 63 and the second metal shield 64 are located on two sides of the insulating frame 61, respectively. The posts 616 include a plurality of first posts 6161 and a plurality of second posts 6162. The first posts 6161 and the second posts 6162 are located on opposite sides of the insulating frame 61 so to be fixed to the first metal shield 63 and the second metal shield 64, respectively.

Referring to FIGS. 16 to 22, in the illustrated embodiment of the present disclosure, each group of conductive terminals 62 include a contact portion 621, a tail portion 622 and a connection portion 623 located between the contact portion 621 and the tail portion 622. The mounting block 8 includes a plurality of through holes for the tail portions 622 to pass through, so as to facilitate the positioning of each tail portion 622. This facilitates the mounting of the tail portions 622 to the first circuit board 302. Some of the contact portions 621 are used to electrically connect with the mating backplane connector 100. In the illustrated embodiment of the present disclosure, the connection portion 623 is curved. Specifically, the connection portion 623 includes a first section 623a parallel to the contact portion 621, a second section 623b parallel to the tail portion 622, and a third section 623c connecting the first section 623a and the second section 623b. Referring to FIG. 15, the first section 623a extends vertically, the second section 623b extends horizontally, and the third section 623c extends obliquely.

Each group of conductive terminals 62 include a plurality of first ground terminals G1, a plurality of second ground terminals G2, and a plurality of signal terminals S. The plurality of signal terminals S include a plurality of first signal terminals 51 and a plurality of second signal terminals S2. In the illustrated embodiment of the present disclosure, the adjacent first signal terminal S1 and the second signal terminal S2 form a pair of differential signal terminals (Differential Pair). Each pair of differential signal terminals are located between one first ground terminal G1 and one second ground terminal G2. That is, each group of conductive terminals 62 are disposed in a manner of G1-S1-S2-G2, which is beneficial to improve the quality of signal transmission. The differential signal terminals are coupled through narrow-side coupling and wide-side coupling. A width of the first ground terminal G1 and a width of the second ground terminal G2 are greater than a width of each first signal terminal S1 and a width of each second signal terminal S2 therebetween, which is beneficial to increase the shielding area and improve the shielding effect.

In the illustrated embodiment of the present disclosure, the connection portions 623 of the conductive terminals 62 are insert-molded with the insulating frame 61. The connection portions 623 of the differential signal terminals, the connection portion 623 of the first ground terminal G1 and the connection portion 623 of the second ground terminal G2 are all exposed in the same hollow portion 610. The connection portion 623 of the signal terminal S includes a narrowed portion 6230 (referring to FIG. 12) embedded in the insulating frame 61 to adjust the impedance of the signal terminal S in order to achieve impedance matching.

Referring to FIGS. 18 to 22, in the illustrated embodiment of the present disclosure, the differential signal terminal further includes a first extending portion 624 extending from the contact portion 621 of the differential signal terminal toward the connection portion 623 of the differential signal terminal, a torsion portion 625 connected to the first extending portion 624, and a second extending portion 626 connected to the torsion portion 625. The first extending portion 624, the torsion portion 625 and the second extending portion 626 extend along the first direction A1-A1 (for example, the front-rear direction). The first extending portion 624 includes a wide side and a narrow side. The second extending portion 626 includes a wide side and a narrow side. The first extending portion 624 of the first signal terminal S1 and the first extending portion 624 of the second signal terminal S2 are arranged side by side, and spaced apart from each other along the second direction A2-A2 (for example, the left-right direction). The narrow side of the first extending portion 624 of the first signal terminal S1 is coupled with the narrow side of the first extending portion 624 of the second signal terminal S2. The second extending portion 626 of the first signal terminal S1 and the second extending portion 626 of the second signal terminal S2 are spaced apart from each other along the third direction A3-A3 (for example, the top-bottom direction). The narrow side of the second extending portion 626 of the first signal terminal S1 is coupled with the narrow side of the second extending portion 626 of the second signal terminal S2. Compared with the first extending portion 624 and the second extending portion 626 at opposite ends of the torsion portion 625, the torsion portion 625 is in a contracted manner, which is beneficial to reduce the resistance when twisting to form the torsion portion 625 and reduce the manufacturing difficulty. In addition, this arrangement is also beneficial to make the torsion area where the torsion portion 625 is located as short as possible, thereby improving the coupling effect of the first signal terminal S1 and the second signal terminal S2. By providing the torsion portion 625, the second extending portion 626 is substantially perpendicular to the first extending portion 624.

Specifically, the first extending portion 624 of the first signal terminal S1 includes a first bottom surface 6240a, a first step surface 6241a higher than the first bottom surface 6240a, a first extension surface 6242a lower than the first step surface 6241a, a first inclined portion 6243a connecting the first bottom surface 6240a and the first step surface 6241a, and a first bending portion 6244a connecting the first step surface 6241a and the first extension surface 6242a.

The first extending portion 624 of the second signal terminal S2 includes a second bottom surface 6240b, a second step surface 6241b higher than the second bottom surface 6240b, a second extension surface 6242b higher than the second step surface 6241b, a second inclined portion 6243b connecting the second bottom surface 6240b and the second step surface 6241b, and a second bending portion 6244b connecting the second step surface 6241b and the second extension surface 6242b.

In the illustrated embodiment of the present disclosure, the contact portion 621, the first bottom surface 6240a, the first inclined portion 6243a and the first step surface 6241a of the first signal terminal S1 are in one-to-one correspondence with the contact portion 621, the second bottom surface 6240b, the second inclined portion 6243b and the second step surface 6241b of the second signal terminal S2, respectively. The contact portion 621, the first bottom surface 6240a, the first inclined portion 6243a and the first step surface 6241a of the first signal terminal S1 have the same structure and are arranged in alignment along the second direction A2-A2 with respect to the corresponding contact portion 621, the corresponding second bottom surface 6240b, the corresponding second inclined portion 6243b and the corresponding second step surface 6241b of the second signal terminal S2. A plane P1 where the first step surface 6241a and the second step surface 6241b are located is located between a plane where the first extension surface 6242a is located and a plane where the second extension surface 6242b is located. In other words, the first extension surface 6242a is upwardly higher than the first step surface 6241a and the second step surface 6241b. The second extension surface 6242b is downwardly lower than the first step surface 6241a and the second step surface 6241b. Preferably, the first bending portion 6244a, the first extension surface 6242a, the torsion portion 625 and the second extending portion 626 of the first signal terminal S1, and the second bending portion 6244b, the second extension surface 6242b, the torsion portion 625 and the second extending portion 626 of the second signal terminal S2 are symmetrically arranged along the plane P1 where the first step surface 6241a and the second step surface 6241b are located. This arrangement is beneficial to make the structures and lengths of the first signal terminal S1 and the second signal terminal S2 closer, thereby helping to improve impedance matching. Each of the first extension surface 6242a and the second extension surface 6242b includes a wide side and a narrow side. The wide side of the first extension surface 6242a is coupled with the wide side of the second extension surface 6242b. In the illustrated embodiment of the present disclosure, the torsion portion 625 of the first signal terminal S1 and the torsion portion 625 of the second signal terminal S2 have the same torsion angle. This arrangement facilitates the use of a clamp to tort the first signal terminal S1 and the second signal terminal S2 simultaneously, thereby improving production efficiency.

Compared with the prior art, in the present disclosure, the first extending portion 624 and the second extending portion 626 of the first signal terminal S1 and the second signal terminal S2 are perpendicular to each other. The first bottom surface 6240a, the first inclined portion 6243a and the first step surface 6241a of the first signal terminal S1 are in one-to-one correspondence with the second bottom surface 6240b, the second inclined portion 6243b and the second step surface 6241b of the second signal terminal S2, respectively. The first bottom surface 6240a, the first inclined portion 6243a and the first step surface 6241a of the first signal terminal S1, and the corresponding second bottom surface 6240b, the corresponding second inclined portion 6243b and the corresponding second step surface 6241b of the second signal terminal S2 have the same structure and are coupled through narrow sides. The second extending portion 626 of the first signal terminal S1 corresponds to the second extending portion 626 of the second signal terminal S2. The second extending portion 626 of the first signal terminal S1 and the second extending portion 626 of the second signal terminal S2 have the same structure and are coupled through narrow sides. The first extension surface 6242a of the first signal terminal S1 adjacent to the torsion portion 625 of the first signal terminal S1, and the second extension surface 6242b of the second signal terminal S2 adjacent to the torsion portion 625 of the second signal terminal S2 are coupled through wide sides. This arrangement is beneficial to tightly couple the first signal terminal S1 and the second signal terminal S2 in the differential signal terminals, thereby stabilizing the insertion loss and improving the signal transmission quality of the differential signal terminals.

Figure 20:
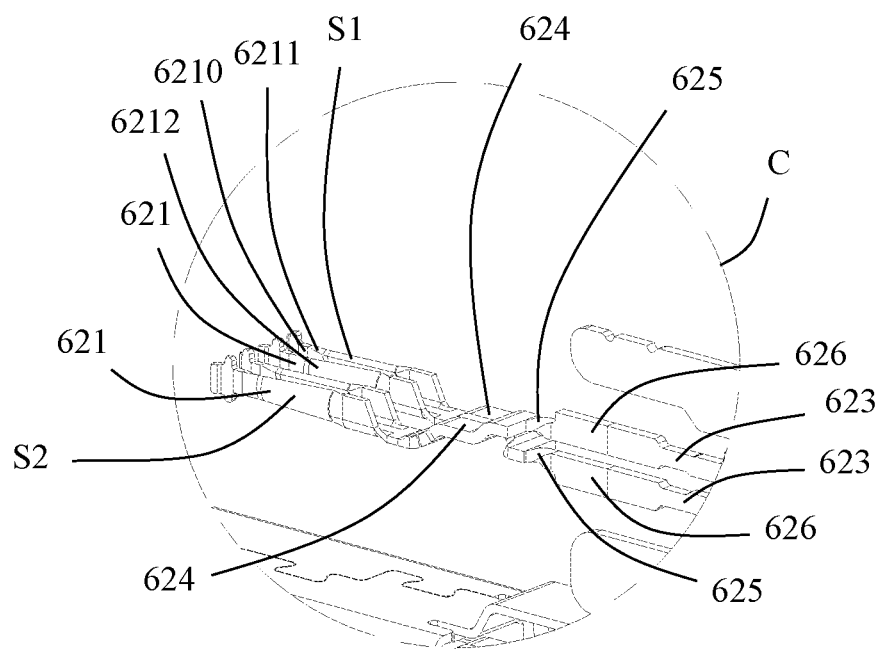
FIG. 20 is a partial enlarged view of a circled part C in FIG. 18.
Figure 21:
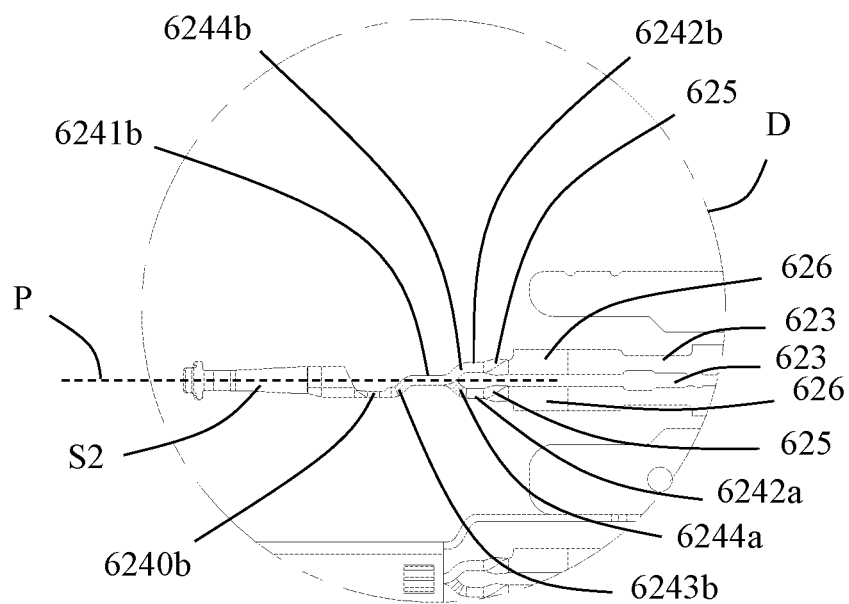
FIG. 21 is a partial enlarged view of a circled part D in FIG. 19.
Figure 22:
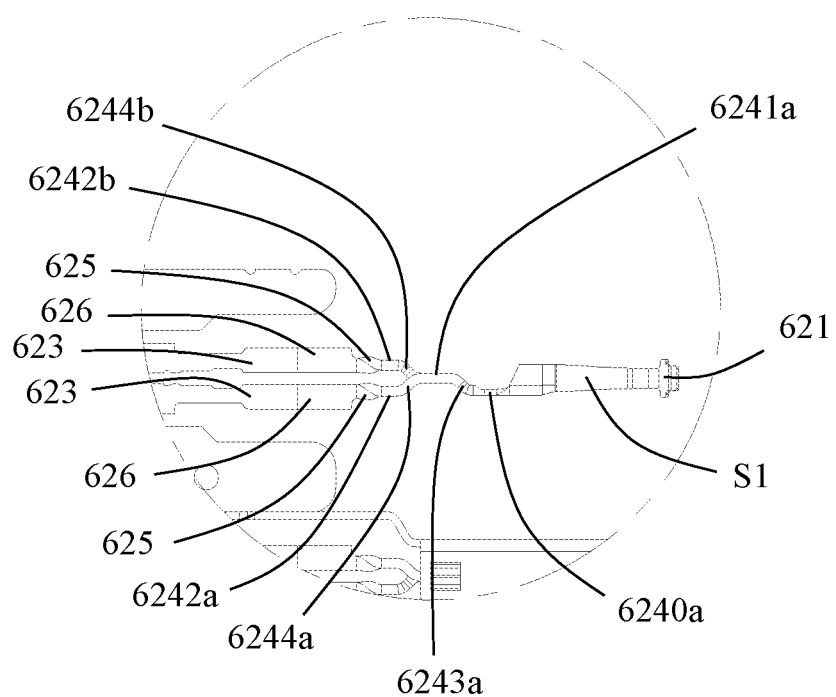
FIG. 22 is a partial enlarged view of FIG. 21 from another angle.

Referring to FIG. 20, in the illustrated embodiment of the present disclosure, each contact portion 621 of the signal terminal S has a two-half configuration. In the same pair of differential signal terminals, the contact portion 621 of the first signal terminal S1 and the contact portion 621 of the second signal terminal S2 are the same so as to reduce cost. Hereinafter, only the contact portion 621 of the first signal terminal S1 is taken as an example for description.

The contact portion 621 of the first signal terminal S1 includes a first contact arm 6211, a second contact arm 6212 opposite to the first contact arm 6211, and a first clamping space 6210 located between the first contact arm 6211 and the second contact arm 6212. The first contact arm 6211 and the second contact arm 6212 are formed by bending two opposite edges of the first signal terminal S1 to the same side (i.e., a bottom-to-top side). The first contact arm 6211 and the second contact arm 6212 are disposed symmetrically at opposite sides of the first clamping space 6210.

When a needle-shaped signal terminal of the mating backplane connector 100 is inserted into the first clamping space 6210, the first contact arm 6211 and the second contact arm 6212 can be elastically deformed so as to improve contact reliability.

Each contact portion 621 of the first ground terminal G1 and the second ground terminal G2 is substantially flat. The contact portion 621 of the first ground terminal G1, the contact portion 621 of the second ground terminal G2, and the connection portions 623 of the conductive terminals 62 are all coplanar. The contact portion 621 of the first ground terminal G1 and the contact portion 621 of the second ground terminal G2 both extend into the corresponding grooves 6122 to facilitate contact with the first metal shield 63 and the second metal shield 64. The contact portions 621 of the signal terminals S extend beyond the protruding block 6121.

Figure 16:
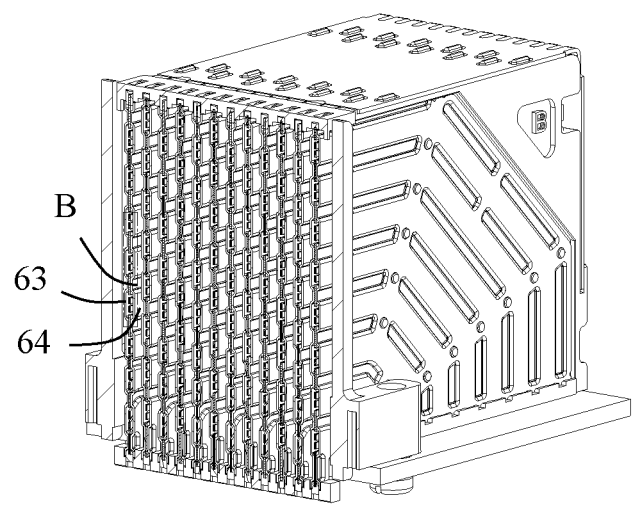
FIG. 16 is a perspective sectional view taken along line K-K in FIG. 2.
Figure 17:
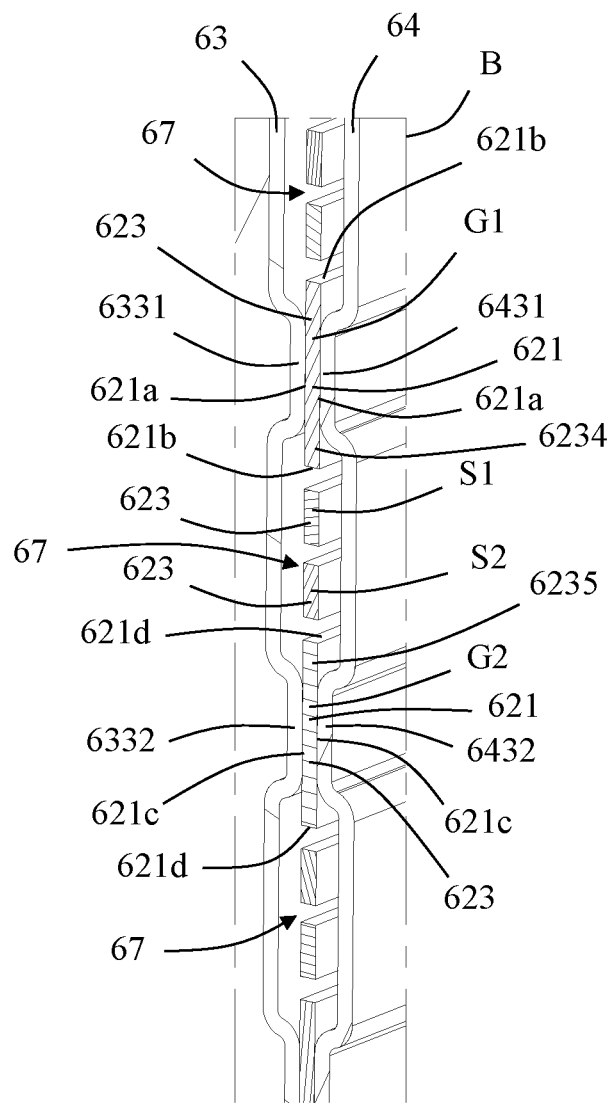
FIG. 17 is a partial enlarged view of a frame part B in FIG. 16.

Referring to FIGS. 16 and 17, in the illustrated embodiment of the present disclosure, the contact portion 621 and the connection portion 623 of the first ground terminal G1 both include a first wide surface 621a and a first narrow surface 621b perpendicular to the first wide surface 621a. The contact portion 621 and the connection portion 623 of the second ground terminal G2 both include a second wide surface 621c and a second narrow surface 621d perpendicular to the second wide surface 621c. The connection portions 623 of each pair of differential signal terminals are located between the first narrow surface 621b of the first ground terminal G1 and the second narrow surface 621d of the second ground terminal G2 which are located on opposite sides of the connection portions 623 of each pair of differential signal terminals.

Figure 18:
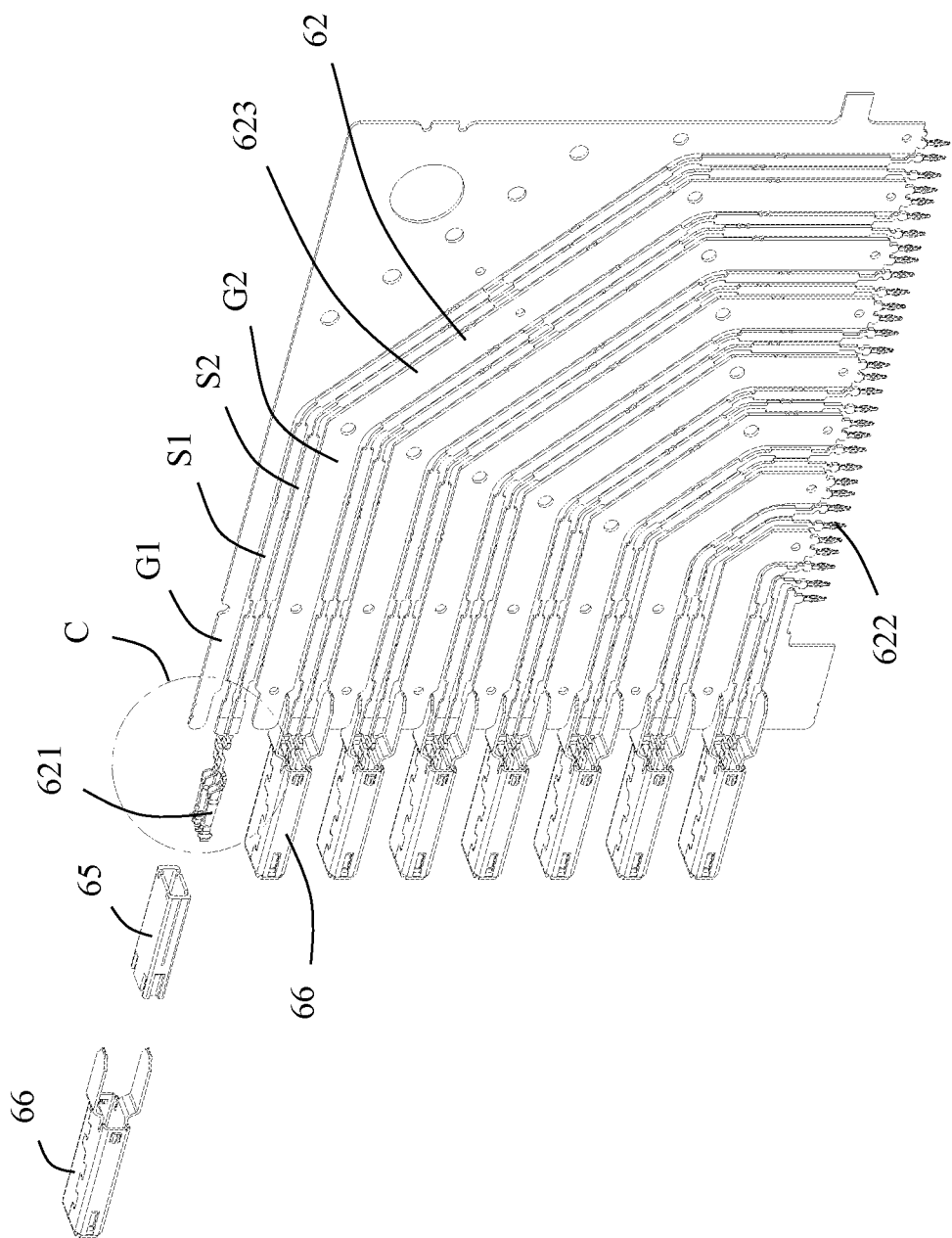
FIG. 18 is a partial perspective exploded view of conductive terminals in the terminal module.
Figure 19:
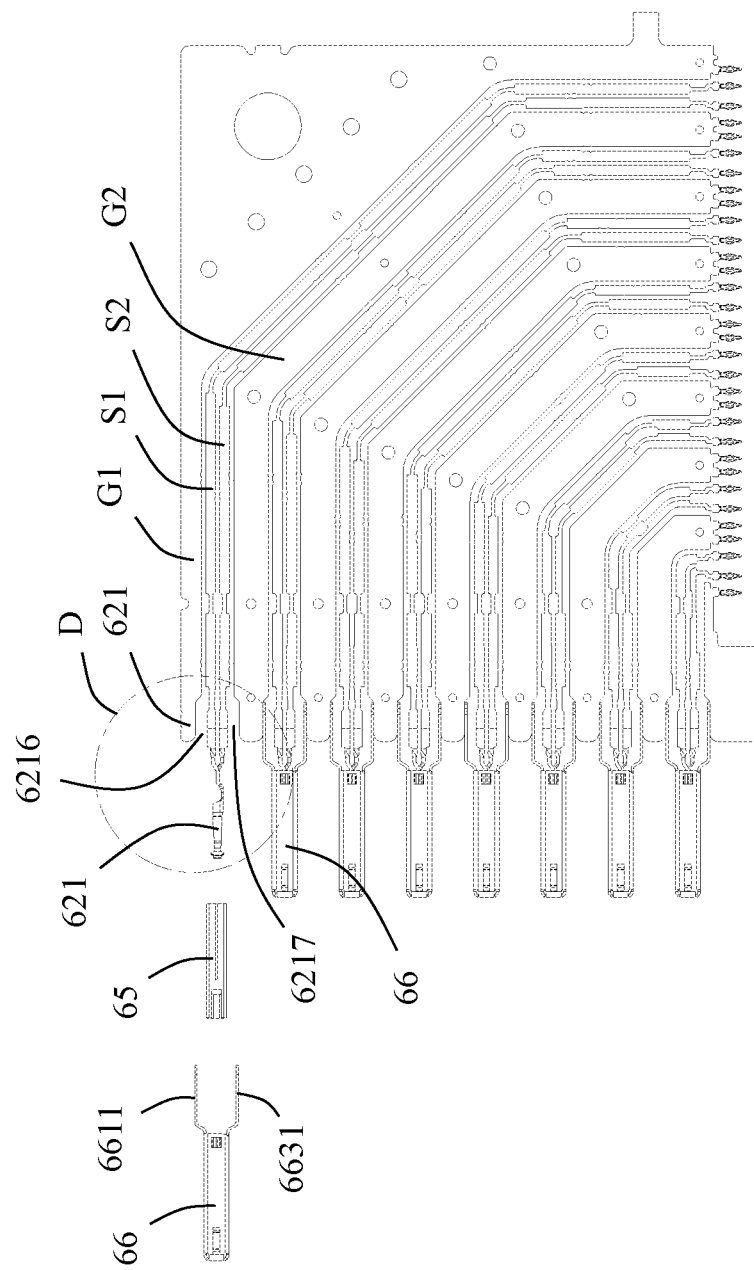
FIG. 19 is a front view of FIG. 18.
Figure 23:
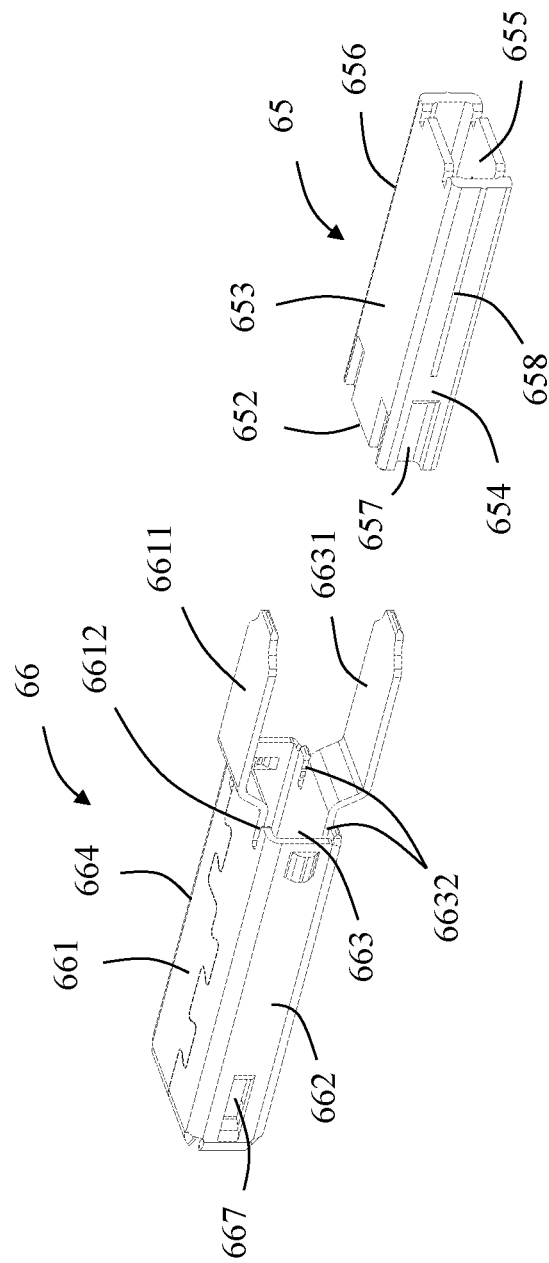
FIG. 23 is a perspective exploded view of the metal shield surround and the insulating block.
Figure 28:
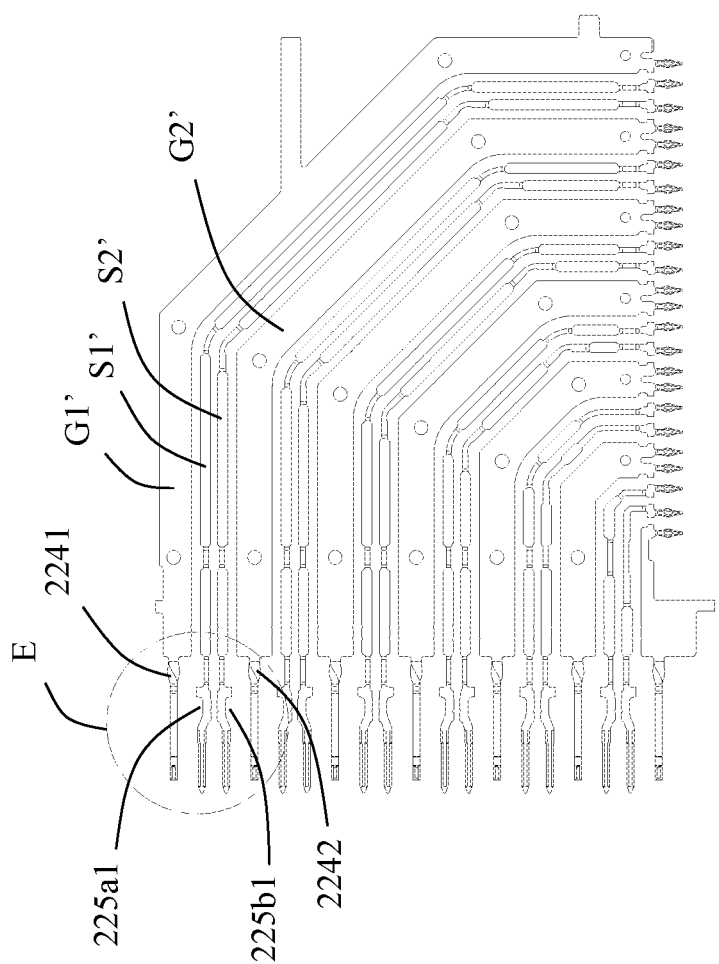
FIG. 28 is a side view of the mating conductive terminals in FIG. 27.
Figure 29:
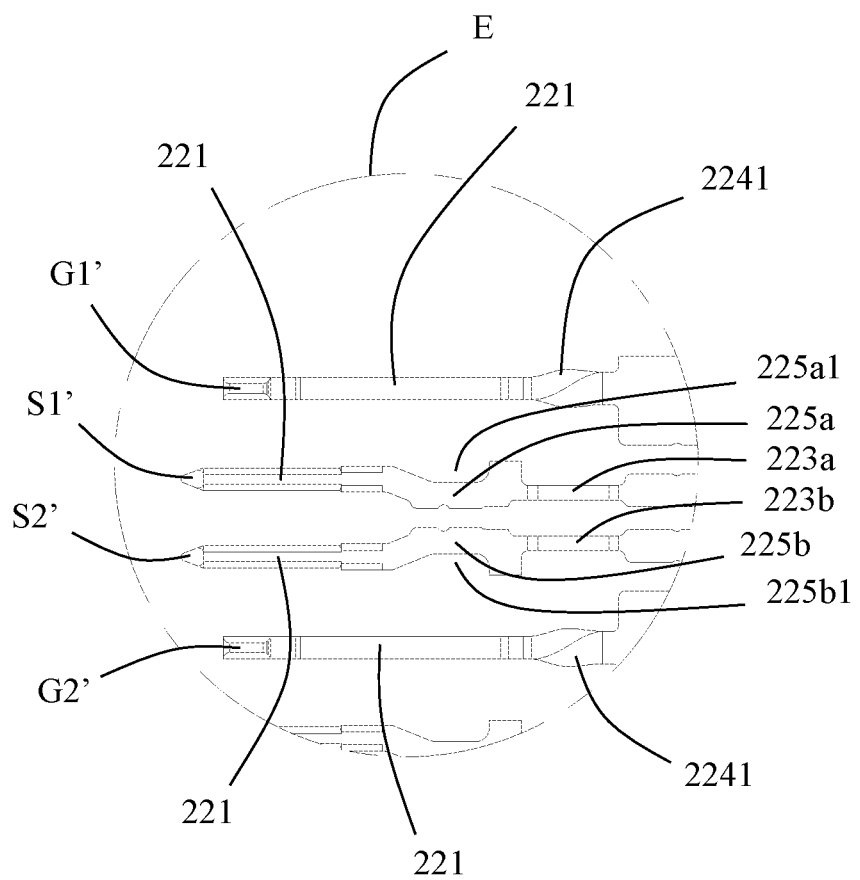
FIG. 29 is a partial enlarged view of a circled part E in FIG. 28.

Referring to FIGS. 18, 19 and 23, each group of terminal modules 6 further includes an insulating block 65 sleeved on the contact portions 621 of the signal terminals S, and a metal shield surrounding member 66 sleeved on the insulating block 65. Referring to FIG. 28, each of the insulating blocks 65 includes a mating surface 652 at an end and a terminal receiving hole 6511 extending through the mating surface 652. In the illustrated embodiment of the present disclosure, the insulating block 65 is substantially cuboid shaped. The insulating block 65 includes a first side surface 653, a second side surface 654, a third side surface 655, and a fourth side surface 656 which are connected in sequence. Each of second side surface 654 and the fourth side surface 656 includes a limiting groove 657 extending through the mating surface 652 and a protruding rib 658 located behind the limiting groove 657.

The metal shield surrounding member 66 is substantially cuboid shaped. In an embodiment of the present disclosure, the insulating block 65 is fixed in the metal shield surrounding member 66 by soldering. Of course, in other embodiments, the insulating block 65 may also be fixed in the metal shield surrounding member 66 in other ways.

Figure 10:
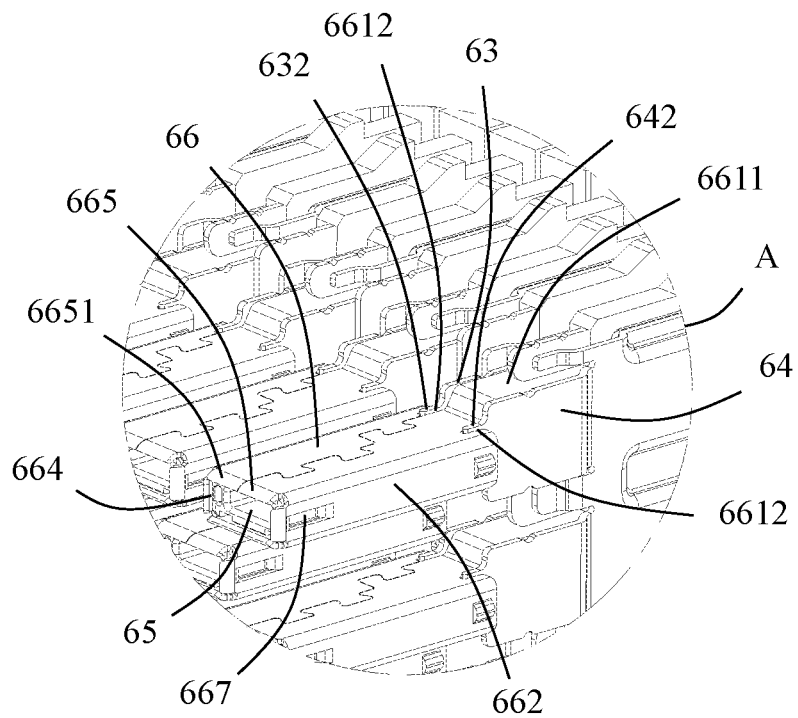
FIG. 10 is a partial enlarged view of a circled part A in FIG. 9.

Referring to FIGS. 10 and 23, the metal shield surrounding member 66 includes a first side wall 661, a second side wall 662, a third side wall 663 and a fourth side wall 664. The first side wall 661 is opposite to the third side wall 663. The second side wall 662 is opposite to the fourth side wall 664. The first side wall 661, the second side wall 662, the third side wall 663 and the fourth side wall 664 respectively correspond to the first side surface 653, the second side surface 654, the third side surface 655 and the fourth side surface 656 of the insulating block 65. An area of either of the first side wall 661 and the third side wall 663 is larger than an area of either of the second side wall 662 and the fourth side wall 664. The ends of the first side wall 661, the second side wall 662, the third side wall 663 and the fourth side wall 664 all include a deflection portion 665 which is bent inwardly. By providing the deflection portions 665, a constricted portion can be formed at an end of the metal shield surrounding member 66, so that outer surfaces 6651 of the deflection portions 665 can guide the terminal module 6 to be assembled to the header 5, and even guide the metal shield surrounding member 66 to be inserted into the mating backplane connector. In addition, the second side wall 662 and the fourth side wall 664 further include protrusions 667 formed by stamping the second side wall 662 and the fourth side wall 664 inwardly. When the metal shield surrounding member 66 and the insulating block 65 are assembled, the protrusions 667 extend into the limiting grooves 657 so as to achieve the position limit. When the metal shield surrounding member 66 and the insulating block 65 are assembled in place, the protruding ribs 658 of the second side surface 654 and the fourth side surface 656 abut against the second side wall 662 and the fourth side wall 664, respectively, so as to improve fixing force. In addition, the protrusions 667 abut against the rear ends of the limiting grooves 657 so as to limit the relative position between the metal shield surrounding member 66 and the insulating block 65.

In the illustrated embodiment of the present disclosure, the metal shield surrounding member 66 further includes a first extension piece 6611 extending from the first side wall 661 and a pair of first slots 6612 located on opposite sides of the first extension piece 6611. The metal shield surrounding member 66 further includes a second extension piece 6631 extending from the third side wall 663 and a pair of second slots 6632 located on opposite sides of the second extension piece 6631. The first extension piece 6611 is in vertical contact with the contact portion 621 of the first ground terminal G1 so as to improve the shielding effect. The second extension piece 6631 is in vertical contact with the contact portion 621 of the second ground terminal G2 so as to improve the shielding effect. In the illustrated embodiment of the present disclosure, the first extension piece 6611 and the second extension piece 6631 are deflected outwardly and then extend, so that a distance between the first extension piece 6611 and the second extension piece 6631 on the same metal shield surrounding member 66 is greater than a distance between the first side wall 661 and the third side wall 663. Referring to FIG. 19, for a group of conductive terminals 62 disposed in the manner of G1-S1-S2-G2, the contact portion 621 of the first ground terminal G1 includes a first notch 6216 adjacent to the differential signal terminals. The first notch 6216 is used for receiving the first extension piece 6611. The contact portion 621 of the second ground terminal G2 includes a second notch 6217 adjacent to the differential signal terminals. The second notch 6217 is used for receiving the second extension piece 6631. In the illustrated embodiment of the present disclosure, taking two adjacent pairs of differential signal terminals sharing one second ground terminal G2 as an example, two sides of the second ground terminal G2 respectively include second notches 6217 facing different differential signal terminals, and the second notches 6217 are used for mating with two adjacent metal shield surrounding members 66.

Figure 11:
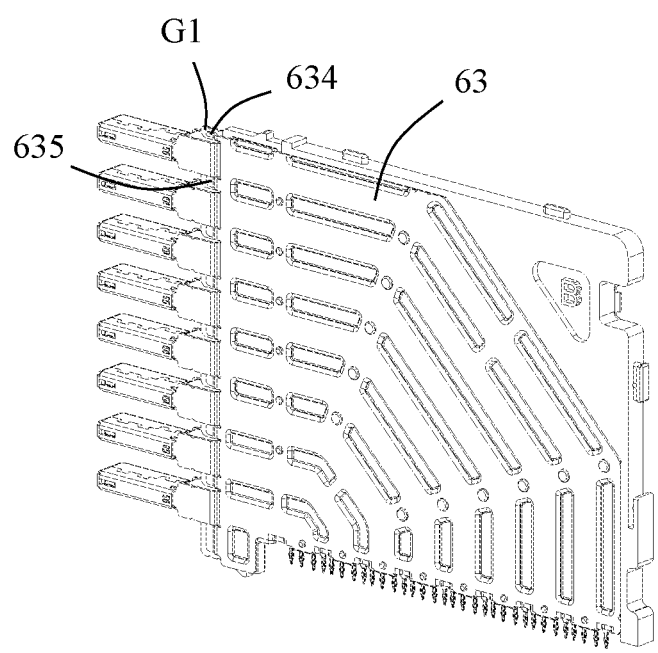
FIG. 11 is a perspective schematic view of the terminal module of the backplane connector.
Figure 13:
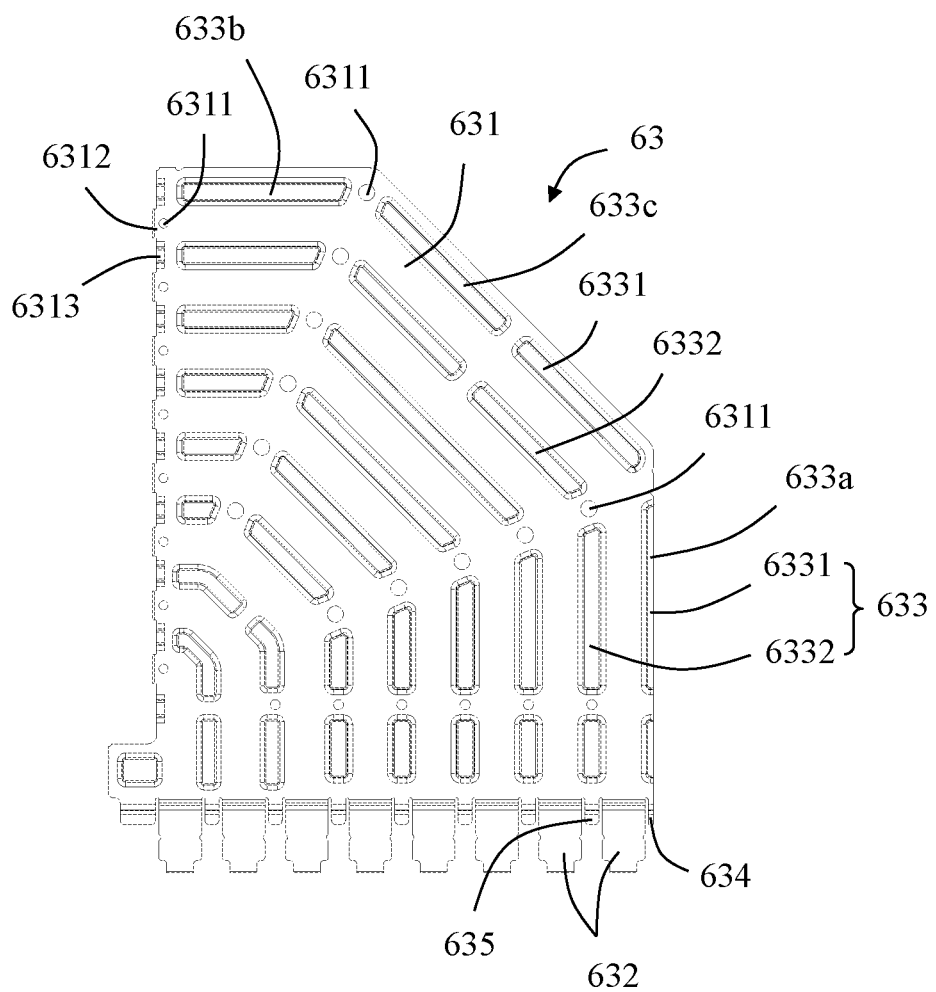
FIG. 13 is a side view of a first metal shield of the backplane connector.

In the illustrated embodiment of the present disclosure, the first metal shield 63 and the second metal shield 64 are symmetrically disposed on both sides of the insulating frame 61. Referring to FIGS. 12 and 13, the first metal shield 63 includes a first main body portion 631, a first extension portion 632 extending from the first main body portion 631, and a first elastic arm 634 and a second elastic arm 635 which are respectively located on two sides of the first extension portion 632. The first elastic arm 634 and the second elastic arm 635 extend beyond the first main body portion 631 to contact the first ground terminal G1 and the second ground terminal G2, respectively. The first main body portion 631 is located on one side of the connection portion 623 of the conductive terminal 62. In the illustrated embodiment of the present disclosure, the first extension portion 632 and the first main body portion 631 are located in different planes, in which the first extension portion 632 is farther away from the second metal shield 64 than the first main body portion 631. The first main body portion 631 includes a plurality of first mounting holes 6311 for mating with the plurality of first posts 6161. The first posts 6161 are fixed to the first mounting holes 6311 by soldering. The first main body portion 631 includes a plurality of ribs 633. The ribs 633 include a plurality of first ribs 6331 protruding toward the first ground terminal G1 and a plurality of second ribs 6332 protruding toward the second ground terminal G2. The first ribs 6331 are disposed along an extending direction of the connection portion 623 of the first ground terminal G1. The second ribs 6332 are disposed along an extending direction of the connection portion 623 of the second ground terminal G2. In the illustrated embodiment of the present disclosure, the first ribs 6331 and the second ribs 6332 are formed by stamping the first main body portion 631. The first ribs 6331 and the second ribs 6332 protrude toward the second metal shield 64. The first ribs 6331 and the second ribs 6332 are disposed discontinuously along the extending direction of the connection portion 623 of the first ground terminal G1 and the extending direction of the connection portion 623 of the second ground terminal G2, respectively, so as to achieve multi-position contact. Therefore, the reliability of the contact between the first metal shield 63 and the first ground terminals G1 and the second ground terminals G2 is improved. In the illustrated embodiment of the present disclosure, a wall thickness of the first rib 6331, a wall thickness of the second rib 6332, and a wall thickness of a portion of the first main body portion 631 located between the first rib 6331 and the second rib 6332 are the same. Specifically, each of the first rib 6331 and the second rib 6332 includes a first rib section 633a parallel to the contact portion 621, a second rib section 633b parallel to the tail portion 622, and a third rib section 633c connecting the first rib section 633a and the second rib section 633b. Referring to FIG. 11, the first rib section 633a extends vertically, the second rib section 633b extends horizontally, and the third rib section 633c extends obliquely. The first rib section 633a, the second rib section 633b and the third rib section 633c correspondingly contact the first section 623a, the second section 623b and the third section 623c of the first ground terminal G1 and the second ground terminal G2, respectively.

In addition, the first main body portion 631 further includes a plurality of first protruding pieces 6312 extending downwardly from a bottom edge thereof and a plurality of connecting pieces 6313 each of which is located between two adjacent first protruding pieces 6312. By providing the first protruding pieces 6312, the shielding length can be extended, and the shielding effect on the signal terminals S can be improved. In the illustrated embodiment of the present disclosure, the connecting pieces 6313 are stamped from the first main body portion 631. The connecting piece 6313 straddles the corresponding slot 6231 to connect one side of the first end portion 6232 and the second end portion 6233 of the same first ground terminal G1, thereby improving the shielding effect. At the same time, the connecting piece 6313 can also connect one side of the first end portion 6232 and the second end portion 6233 of the same second ground terminal G2, thereby improving the shielding effect.

In the illustrated embodiment of the present disclosure, there are multiple first extension portions 632 which are disposed at intervals. The first extension portions 632 are used to be inserted into the first slots 6612 and the second slots 6632 of the metal shield surrounding member 66 to achieve contact and improve the shielding effect.

Figure 14:
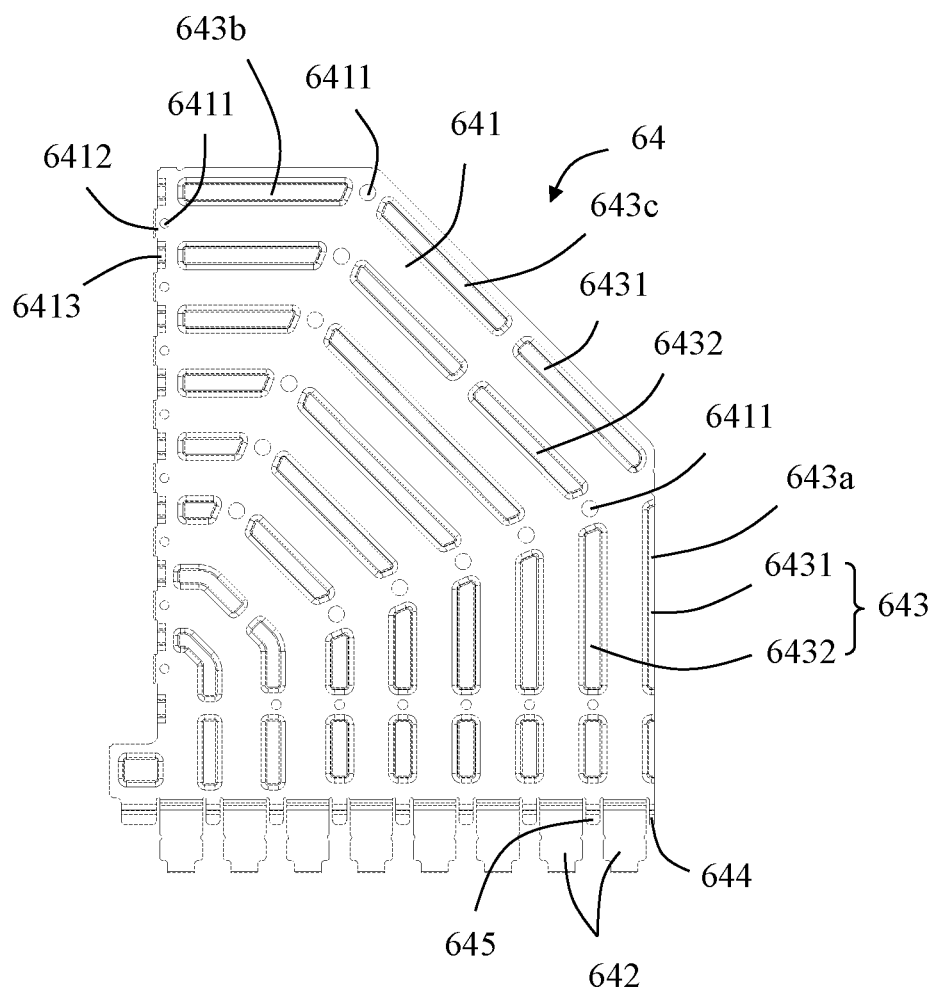
FIG. 14 is a side view of a second metal shield of the backplane connector.

Similarly, referring to FIGS. 12 and 14, the second metal shield 64 includes a second main body portion 641, a second extension portion 642 extending from the second main body portion 641, and a third elastic arm 644 and a fourth elastic arm 645 which are respectively located on both sides of the second extension portion 642. The third elastic arm 644 and the fourth elastic arm 645 extend beyond the second main body portion 641 to contact the first ground terminal G1 and the second ground terminal G2, respectively. The second main body portion 641 is located on the other side of the connection portion 623 of the conductive terminal 62. In the illustrated embodiment of the present disclosure, the second extension portion 642 and the second main body portion 641 are located in different planes, in which the second extension portion 642 is farther away from the first metal shield 63 than the second main body portion 641. The second main body portion 641 includes a plurality of second mounting holes 6411 for mating with the plurality of second posts 6162. The second posts 6162 are fixed and positioned in the second mounting holes 6411 by soldering. The second main body portion 641 includes a plurality of ribs 643. The ribs 643 include a plurality of third ribs 6431 protruding toward the first ground terminal G1 and a plurality of fourth ribs 6432 protruding toward the second ground terminal G2. The third ribs 6431 are disposed along the extending direction of the connection portion 623 of the first ground terminal G1. The fourth ribs 6432 are disposed along the extending direction of the connection portion 623 of the second ground terminal G2. In the illustrated embodiment of the present disclosure, the third ribs 6431 and the fourth ribs 6432 are formed by stamping the second main body portion 641. The third ribs 6431 and the fourth ribs 6432 protrude toward the first metal shield 63. The third ribs 6431 and the fourth ribs 6432 are disposed discontinuously along the extending direction of the connection portion 623 of the first ground terminal G1 and the extending direction of the connection portion 623 of the second ground terminal G2, respectively, so as to achieve multi-position contact. Therefore, the contact reliability between the second metal shield 64 and the first ground terminals G1 and the second ground terminals G2 is improved. In the illustrated embodiment of the present disclosure, a wall thickness of the third rib 6431, a wall thickness of the fourth rib 6432, and a wall thickness of a portion of the second main body portion 641 located between the third rib 6431 and the fourth rib 6432 are the same. Specifically, each of the third rib 6431 and the fourth rib 6432 includes a fourth rib section 643a parallel to the contact portion 621, a fifth rib section 643b parallel to the tail portion 622, and a six rib section 643c connecting the fourth rib section 643a and the fifth rib section 643b. Referring to FIG. 14, the fourth rib section 643a extends vertically, the fifth rib section 643b extends horizontally, and the sixth rib section 643c extends obliquely. The fourth rib section 643a, the fifth rib section 643b and the sixth rib section 643c correspondingly contact the first section 623a, the second section 623b and the third section 623c of the first ground terminal G1 and the second ground terminal G2, respectively.

In an embodiment of the present disclosure, soldering is performed on the surfaces of the ribs 633 and the ribs 643 to solder the ribs 633 and the ribs 643 to the first ground terminals G1 and the second ground terminals G2. For example, soldering is performed on the surfaces of the first ribs 6331, the second ribs 6332, the third ribs 6431 and the fourth ribs 6432 so that the first ribs 6331, the second ribs 6332, the third ribs 6431 and the fourth ribs 6432 are soldered to the first ground terminals G1 and the second ground terminals G2. The soldering method is at least one of spot soldering, laser soldering and ultrasonic soldering.

In addition, the second main body portion 641 further includes a plurality of fourth protruding pieces 6412 extending downwardly from a bottom edge thereof, and a plurality of connecting pieces 6413 each of which is located between two adjacent fourth protruding pieces 6412. By providing the fourth protruding pieces 6412, the shielding length can be extended, and the shielding effect on the signal terminals S can be improved. In the illustrated embodiment of the present disclosure, the connecting pieces 6413 is stamped from the second main body portion 641. The connecting piece 6413 straddles the corresponding slot 6231 to connect the first end 6232 and the other side of the second end 6233 of the same first ground terminal G1 so as to improve the shielding effect. At the same time, the connecting piece 6413 can also connect the first end portion 6232 and the other side of the second end portion 6233 of the same second ground terminal G2 so as to improve the shielding effect.

In the illustrated embodiment of the present disclosure, there are multiple second extension portions 642 which are disposed at intervals. The second extension portions 642 are used to be inserted into the first slots 6612 and the second slots 6632 of the metal shield surrounding member 66 so as to achieve contact and improve the shielding effect.

Referring to FIG. 17, in the length of the connection portion 623 of the conductive terminal 62, the first rib 6331 of the first metal shield 63 and the third rib 6431 of the second metal shield 64 are in contact with two opposite side surfaces of the connection portion 623 of the first ground terminal G1, respectively. The second rib 6332 of the first metal shield 63 and the fourth rib 6432 of the second metal shield 64 are in contact with two opposite side surfaces of the connection portion 623 of the second ground terminal G2, respectively. As a result, a shielding cavity 67 surrounding the outer periphery of the connection portion 623 of each pair of differential signal terminals is formed. In the illustrated embodiment of the present disclosure, the first rib 6331 and the third rib 6431 contact the first wide surface 621a of the connection portion 623 of the first ground terminal G1, respectively. The second rib 6332 and the fourth rib 6432 contact the second wide surface 621c of the connection portion 623 of the second ground terminal G2, respectively. In the illustrated embodiment of the present disclosure, the shielding cavity 67 is formed by the first main body portion 631, the second main body portion 641, the first ground terminal G1 and the second ground terminal G2. The connection portion 623 of the first ground terminal G1 includes a first tab portion 6234 extending into the shielding cavity 67. The connection portion 623 of the second ground terminal G2 includes a second tab portion 6235 extending into the shielding cavity 67. The connection portions 623 of the differential signal terminals are located between the first tab portion 6234 and the second tab portion 6235. In the illustrated embodiment of the present disclosure, there are a plurality of shielding cavities 67 which are disposed along an arrangement direction of each group of the conductive terminals 62. Two adjacent shielding cavities 67 share a single first ground terminal G1 or a single second ground terminal G2. Taking the shared first ground terminal G1 as an example, a part of the shared first ground terminal G1 protrudes into one shielding cavity 67, and another part of the shared first ground terminal G1 protrudes into another shielding cavity 67.

At a position adjacent to the contact portion 621 of the conductive terminal 62, the first extension portion 632 and the second extension portion 642 are both inserted into the first slot 6612 and the second slot 6632 of the metal shield surrounding member 66. The first extension piece 6611 and the second extension piece 6631 of the metal shield surrounding member 66 are respectively inserted into the first notch 6216 of the first ground terminal G1 and the second notch 6217 of the second ground terminal G2. At the same time, the first elastic arm 634 of the first metal shield 63 and the third elastic arm 644 of the second metal shield 64 clamp both sides of the contact portion 621 of the first ground terminal G1. The second elastic arm 635 of the first metal shield 63 and the fourth elastic arm 645 of the second metal shield 64 clamp both sides of the contact portion 621 of the second ground terminal G2. Specifically, the first elastic arm 634 and the third elastic arm 644 clamp the first wide surface 621a of the first ground terminal G1. The second elastic arm 635 and the fourth elastic arm 645 clamp the second wide surface 621c of the second ground terminal G2. With this arrangement, the first metal shield 63, the second metal shield 64, the metal shield surrounding member 66, the first ground terminal G1, and the second ground terminal G2 are all connected in series, thereby the shielding area is increased and the shielding effect is improved.

In the illustrated embodiment of the present disclosure, there are multiple terminal modules 6 of the backplane connector 200, and the terminal arrangement of two adjacent terminal modules 6 are staggered. Correspondingly, the shielding cavities 67 of two adjacent terminal modules 6 are also staggered. When the terminal module 6 is assembled to the header 5, the metal shield surrounding member 66 of the terminal module 6 passes through the corresponding terminal receiving grooves 511 so as to extend into the receiving space 535.

Referring to FIGS. 24 to 29, the mating backplane connector 100 includes a mating header 1, a plurality of mating terminal modules 2 assembled to the mating header 1, a spacer 3 fixed to the plurality of mating terminal modules 2, and a mounting block 4 mounted to bottom ends of the plurality of mating terminal modules 2.

Figure 24:
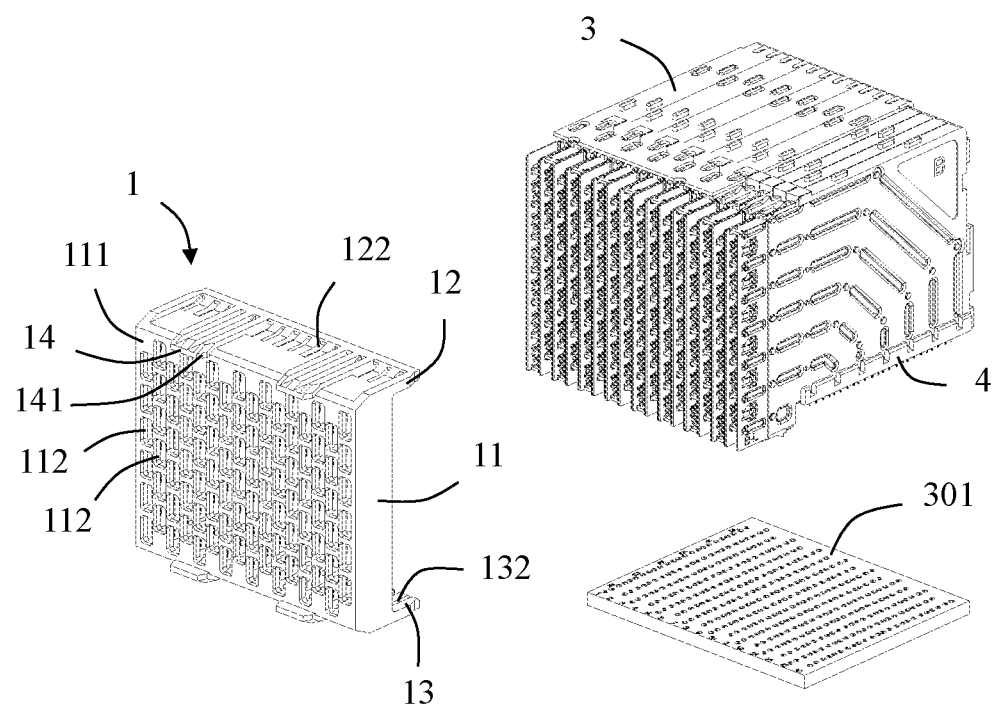
FIG. 24 is a partial perspective exploded view of a mating backplane connector and a second circuit board in accordance with an embodiment of the present disclosure.

Referring to FIG. 24, in an embodiment of the present disclosure, the mating header 1 is made of insulating material. The mating header 1 includes a body portion 11, a first wall portion 12 extending rearwardly from one side of the body portion 11, and a second wall portion 13 extending rearwardly from the other side of the body portion 11. The first wall portion 12 and the second wall portion 13 are in parallel. The body portion 11 includes a mating surface 111 and a plurality of terminal receiving grooves 112 extending through the mating surface 111. In the illustrated embodiment of the present disclosure, the terminal receiving grooves 112 are disposed in multiple rows along a left-right direction, wherein two adjacent rows of terminal receiving grooves 112 are staggered in a vertical direction. That is, in two adjacent rows of terminal receiving grooves 112, the terminal receiving grooves 112 at corresponding positions are not in alignment in the left-right direction. The first wall portion 12 includes a plurality of first locking grooves 122. The second wall portion 13 includes a plurality of second locking grooves 132. The first locking grooves 122 and the second locking grooves 132 extend outwardly along the vertical direction through the first wall portion 12 and the second wall portion 13, respectively. The first locking grooves 122 and the second locking grooves 132 are adapted to lock with the mating terminal modules 2 in order to prevent the mating terminal modules 2 from being separated from the mating header 1. Besides, the mating header 1 also includes a plurality of positioning protrusions 14 extending forwardly from the first wall portion 12 and the second wall portion 13, respectively. The positioning protrusions 14 protrude beyond the mating surface 111. Each positioning protrusion 14 includes a guiding inclined surface 141 formed at an end thereof, which is beneficial to guide the insertion of the backplane connector 200 and the mating backplane connector 100.

Figure 25:
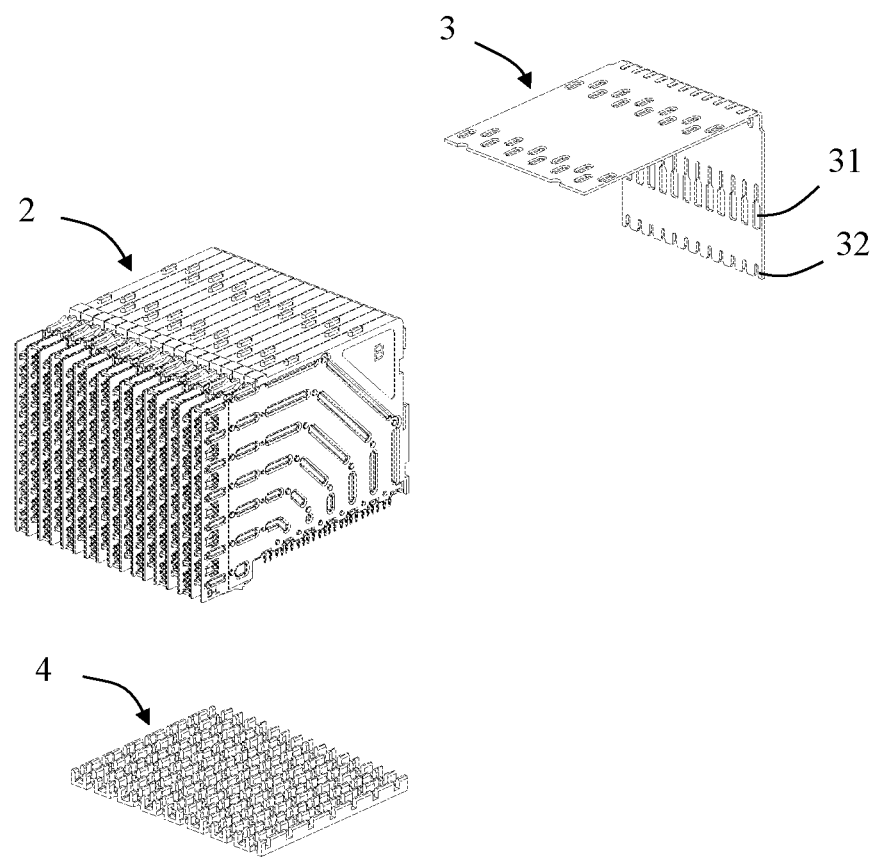
FIG. 25 is a further perspective exploded view after removing a mating header in FIG. 24.
Figure 26:
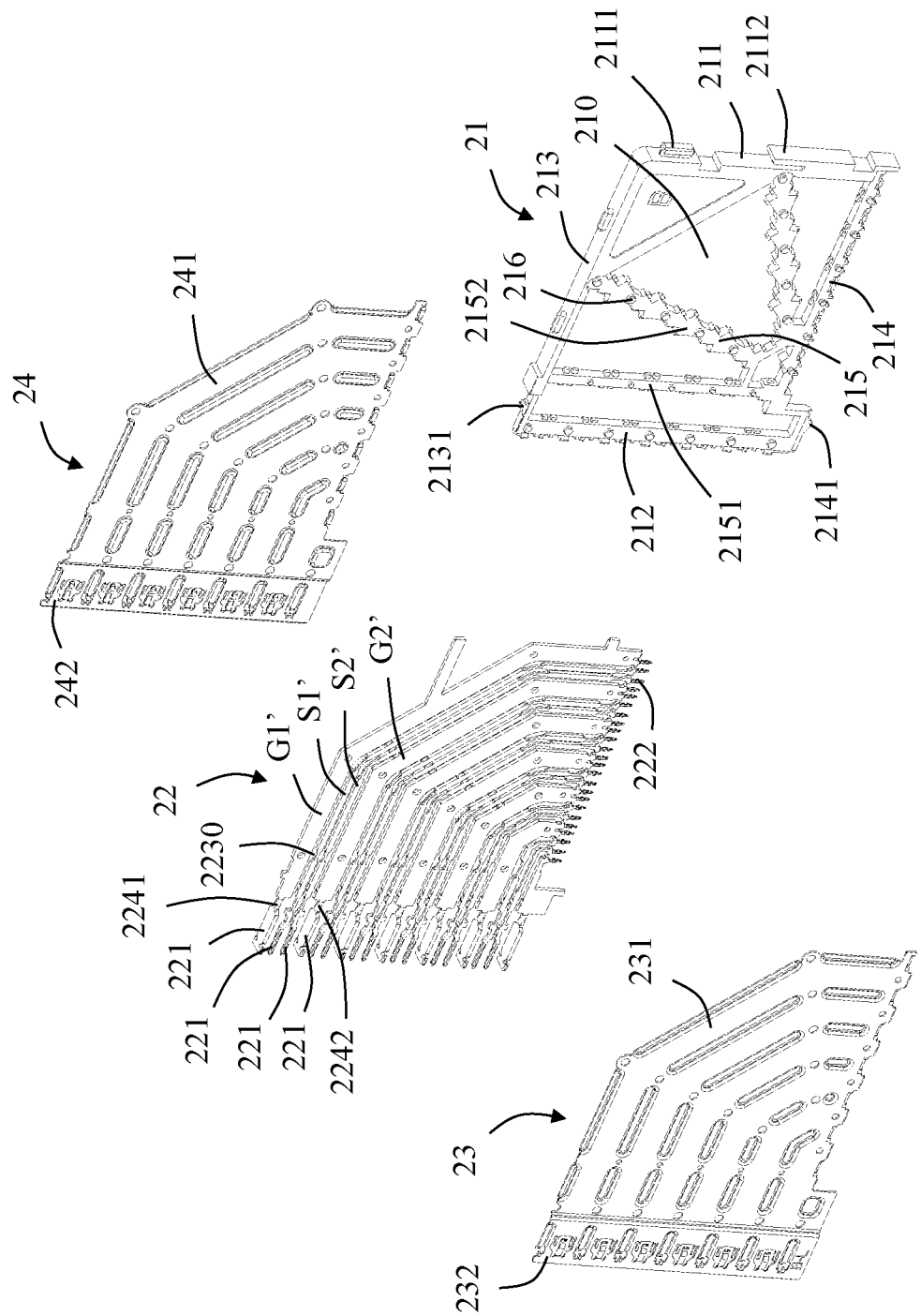
FIG. 26 is an exploded perspective view of a mating terminal module in FIG. 25.
Figure 27:
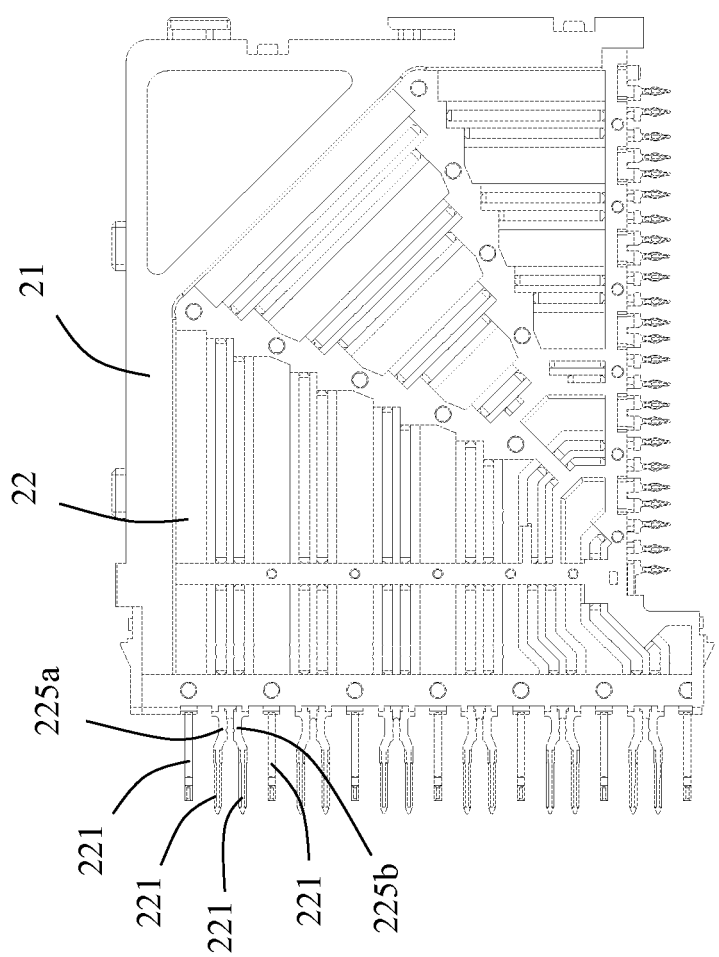
FIG. 27 is a side view of mating conductive terminals and an insulating support frame when they are fixed together.

Referring to FIGS. 25 to 27, the mating terminal module 2 includes an insulating support frame 21, a plurality of mating conductive terminals 22 fixed to the insulating support frame 21, a first metal plate 23 fixed on one side of the insulating support frame 21, and a second metal plate 24 fixed on the other side of the insulating support frame 21.

Each insulating support frame 21 is roughly frame-shaped and includes a first rear wall 211, a first front wall 212 opposite to the first rear wall 211, a first top wall 213 connecting one end of the first rear wall 211 and one end of the first front wall 212, a first bottom wall 214 connecting the other end of the first rear wall 211 and the other end of the first front wall 212, and a plurality of connecting walls 215. The connecting walls 215 are capable of enhancing the structural strength of the frame. The first rear wall 211 includes a first protrusion 2111 and a second protrusion 2112 which protrude rearwardly. The first protrusion 2111 and the second protrusion 2112 are spaced apart from each other along the vertical direction. The first protrusion 2111 and the second protrusion 2112 are in alignment with each other along the vertical direction. The spacer 3 includes a first locking slot 31 and a second locking slot 32 which are in lock with the first protrusion 2111 and the second protrusion 2112, respectively. In the illustrated embodiment of the present disclosure, the insulating support frame 21 includes a hollow portion 210. The connecting walls 215 include a first connecting wall 2151 connecting the first top wall 213 and the first bottom wall 214, and a second connecting wall 2152 connecting the first rear wall 211 and the first bottom wall 214. The first connecting wall 2151 and the second connecting wall 2152 are exposed in the hollow portion 210. The first top wall 213 includes a first locking protrusion 2131 for being inserted into the first locking groove 122. The first bottom wall 214 includes a second locking protrusion 2141 for being inserted into the second locking groove 132.

The insulating support frame 21 further includes a plurality of posts 216 for fixing the first metal plate 23 and the second metal plate 24. In the illustrated embodiment of the present disclosure, the posts 216 are provided on the first bottom wall 214, the first connecting wall 2151, the second connecting wall 2152 and the first front wall 212. The first metal plate 23 and the second metal plate 24 are located on opposite sides of the insulating support frame 21, respectively.

Referring to FIGS. 26 to 28, each mating conductive terminal 22 includes a mating portion 221, an end portion 222 and an intermediate portion 223 located between the mating portion 221 and the end portion 222. Some of the mating portions 221 are used to electrically connect with the backplane connector 200. The end portions 222 are used for being mounted to the second circuit board 301. In the illustrated embodiment of the present disclosure, the mating portion 221 is substantially perpendicular to the end portion 222. The intermediate portion 223 is of a curved configuration.

Each group of mating conductive terminals 22 include a plurality of first mating ground terminals G1', a plurality of second mating ground terminals G2', and a plurality of mating signal terminals S'. The plurality of mating signal terminals S' include a first mating signal terminal S1' and a second mating signal terminal S2'. In the illustrated embodiment of the present disclosure, the first mating signal terminal S1' and the second mating signal terminal S2' adjacent to each other form a pair of mating differential signal terminals. Each pair of mating differential signal terminals are located between one first mating ground terminal G1' and one second mating ground terminal G2'. That is, each group of mating conductive terminals 22 are arranged in a manner of G1'-S1'-S1'-G2', which is beneficial to improve the quality of signal transmission. The mating differential signal terminals are narrow-side coupling or wide-side coupling. A width of the first mating ground terminal G1' and a width the second mating ground terminal G2' are greater than a width of each mating signal terminal S' which is located between the first mating ground terminal G1' and the second mating ground terminal G2'. Therefore, it is beneficial to increase the shielding area and improve the shielding effect.

In the illustrated embodiment of the present disclosure, the intermediate portions 223 of the mating conductive terminals 22 are at least partially insert-molded with the insulating support frame 21. Each intermediate portion 223 of the mating signal terminal S' has a narrowed portion 2230 insert-molded with the insulating support frame 21 so as to adjust the impedance of the mating signal terminal S' for achieving impedance matching. In the illustrated embodiment of the present disclosure, the mating portion 221 of the mating signal terminal S' is substantially needle-shaped. The mating portion 221 of the first mating ground terminal G1' and the mating portion 221 of the second mating ground terminal G2' are substantially rectangular-shaped. The mating portion 221 of the mating signal terminal S' and the intermediate portion 223 of the mating conductive terminal 22 are both coplanar, which means they are located in a same first plane (for example, a horizontal plane). It should be noted that the technical term "coplanar" used in the present disclosure is intended to indicate that related components are substantially flush, which includes situations of incomplete coplanarity caused by manufacturing tolerances. In the illustrated embodiment of the present disclosure, the first mating ground terminal G1' includes a first torsion portion 2241 connecting its mating portion 221 and its intermediate portion 223, so that the mating portion 221 of the first mating ground terminal G1' is located in a second plane (for example, a vertical plane) perpendicular to the first plane. The second mating ground terminal G2' includes a second torsion portion 2242 connecting its mating portion 221 and its intermediate portion 223, so that the mating portion 221 of the second mating ground terminal G2' is also located in the second plane (for example, the vertical plane) perpendicular to the first plane. A wide surface of the mating portion 221 of the first mating ground terminal G1' is disposed facing a wide surface of the mating portion 221 of the second mating ground terminal G2'. The mating portion 221 of the first mating ground terminal G1' and the mating portion 221 of the second mating ground terminal G2' are parallel to each other. A narrow surface of the intermediate portion 223 of the first mating ground terminal G1' is disposed facing a narrow surface of the intermediate portion 223 of the second mating ground terminal G2'.

Referring to FIGS. 26 to 29, the first mating signal terminal S1' also includes a first connecting portion 225a connecting the mating portion 221 of the first mating signal terminal 51' and the intermediate portion 223 of the first mating signal terminal S1'. The first connecting portion 225a includes a first recess 225a1 recessed away from the adjacent first mating ground terminal G1'. In other words, the first recess 225a1 of the first mating signal terminal S1' is recessed toward the second mating signal terminal S2'. In an embodiment of the present disclosure, the first connecting portion 225a has an arc shape. The first recess 225a1 is an arc-shaped recess formed by bending the first connecting portion 225a. Of course, in other embodiments, the first recess 225a1 may also be a cutout formed by cutting the first connecting portion 225a.

Similarly, the second mating signal terminal S2' also includes a second connecting portion 225b connecting the mating portion 221 of the second mating signal terminal S2' and the intermediate portion 223 of the second mating signal terminal S2'. The second connecting portion 225b includes a second recess 225b1 recessed away from the adjacent second mating ground terminal G2'. In other words, the second recess 225b1 of the second mating signal terminal S2' is recessed toward the first mating signal terminal S1'. In an embodiment of the present disclosure, the second connecting portion 225b has an arc shape. The second recess 225b1 is an arc-shaped recess formed by bending the second connecting portion 225b. Of course, in other embodiments, the second recess 225b1 may also be a cutout formed by cutting the second connecting portion 225b.

In the illustrated embodiment of the present disclosure, the first connecting portion 225a extends from one end of the mating portion 221 of the first mating signal terminal S1' toward the second connecting portion 225b. The second connecting portion 225b extends from one end of the mating portion 221 of the second mating signal terminal S2' toward the first connecting portion 225a. A distance between the first connecting portion 225a and the second connecting portion 225b is smaller than a distance between the mating portion 221 of the first mating signal terminal S1' and the mating portion 221 of the second mating signal terminal S2'. The first connecting portion 225a and the second connecting portion 225b protrude beyond the insulating support frame 21.

The intermediate portion 223 of the first mating signal terminal S1' includes a first straight portion 223a connected to the first connecting portion 225a. The first straight portion 223a is parallel to the mating portion 221 of the first mating signal terminal S1'. The intermediate portion 223 of the second mating signal terminal ST includes a second straight portion 223b connected to the second connecting portion 225b. The second straight portion 223b is parallel to the mating portion 221 of the second mating signal terminal S2'. A distance between the first straight portion 223a and the second straight portion 223b is smaller than a distance between the mating portion 221 of the first mating signal terminal S1' and the mating portion 221 of the second mating signal terminal S2'. In the illustrated embodiment of the present disclosure, the first straight portion 223a and the second straight portion 223b are located in the insulating support frame 21.

The mating portion 221 of the first mating signal terminal S1' and the mating portion 221 of the second mating signal terminal S2' are located between the mating portion 221 of the first mating ground terminal G1' and the mating portion 221 of the second mating ground terminal G2'. The first connecting portion 225a extends away from a wide surface of the mating portion 221 of the first mating ground terminal G1'. The second connecting portion 225b extends away from a wide surface of the mating portion 221 of the second ground terminal G2'. As a result, a distance between the wide surface of the mating portion 221 of the first mating ground terminal G1' and the first connecting portion 225a is greater than a distance between the wide surface of the mating portion 221 of the first mating ground terminal G1' and the mating portion 221 of the first mating signal terminal S1'. At the same time, a distance between the wide surface of the mating portion 221 of the second mating ground terminal G2' and the second connecting portion 225b is greater than a distance between the wide surface of the mating portion 221 of the second mating ground terminal G2' and the mating portion 221 of the second mating signal terminal S2'.

In the illustrated embodiment of the present disclosure, the first metal plate 23 and the second metal plate 24 are symmetrically disposed on opposite sides of the insulating support frame 21. Referring to FIG. 26, the first metal plate 23 includes a first main body portion 231 and a first extending portion 232 extending from the first main body portion 231. The first main body portion 231 is located on one side of the intermediate portions 223 of the mating conductive terminals 22. The first extending portion 232 is located on one side of the mating portions 221 of the mating conductive terminals 22. In the illustrated embodiment of the present disclosure, the first extending portion 232 and the first main body portion 231 are located in different planes, in which the first extending portion 232 is farther away from the second metal plate 24 than the first main body portion 231.

Similarly, referring to FIG. 26, the second metal plate 24 includes a second main body portion 241 and a second extending portion 242 extending from the second main body portion 241. The second main body portion 241 is located on the other side of the intermediate portions 223 of the mating conductive terminals 22. The second extending portion 242 is located on the other side of the mating portions 221 of the mating conductive terminals 22. In the illustrated embodiment of the present disclosure, the second extending portion 242 and the second main body portion 241 are located in different planes, in which the second extending portion 242 is farther away from the first metal plate 23 than the second main body portion 241.

Figure 30:
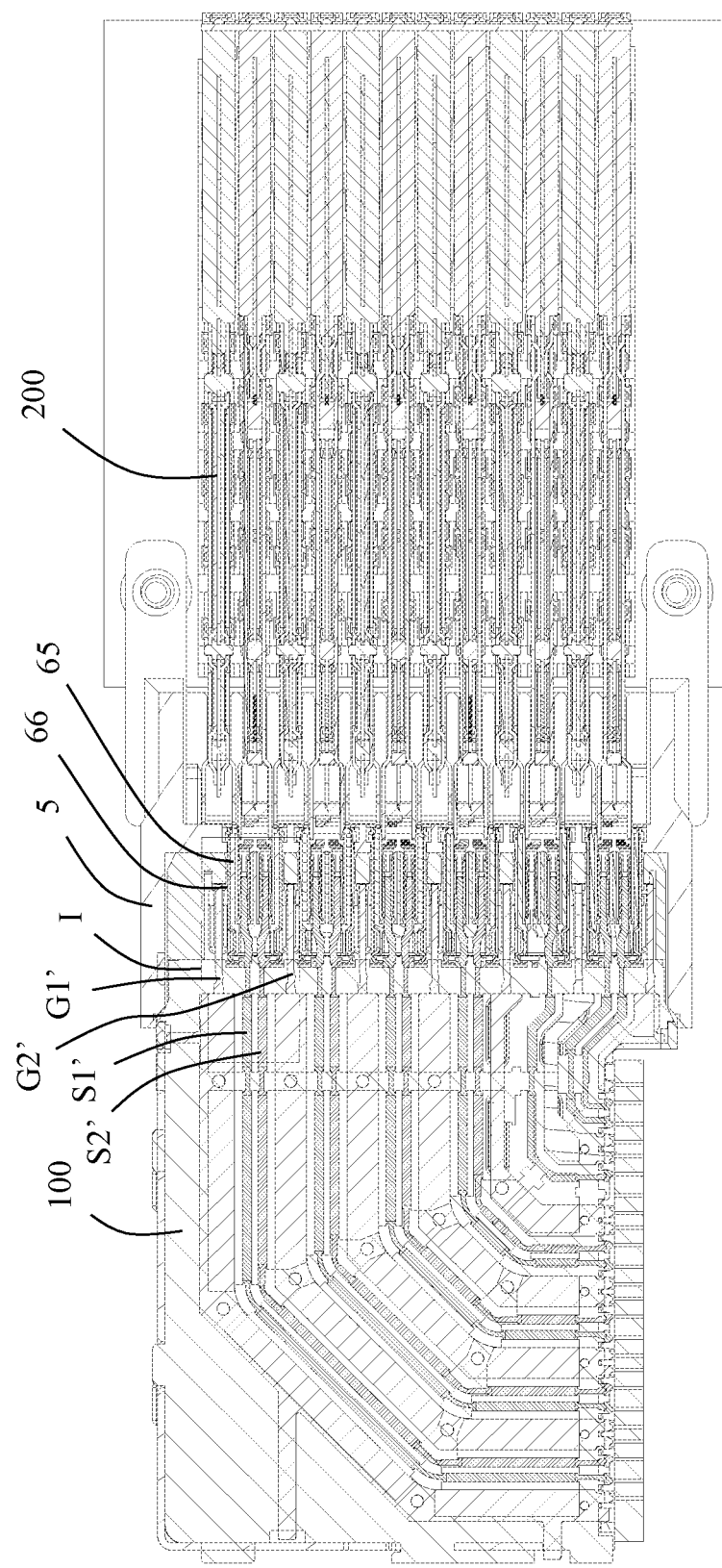
FIG. 30 is a schematic cross-sectional view taken along line F-F in FIG. 1, when the mating backplane connector and the backplane connector are plugged in place.
Figure 31:
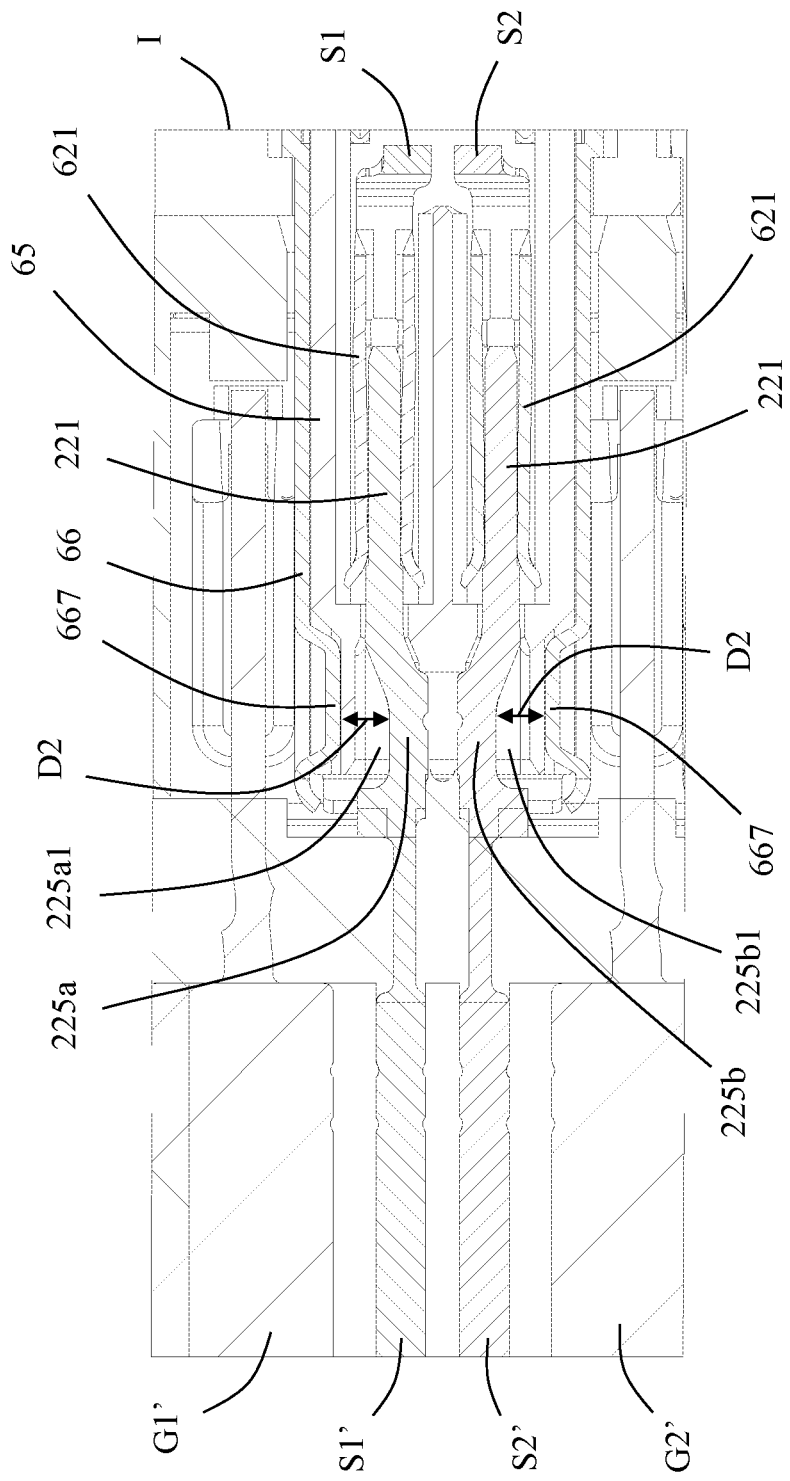
FIG. 31 is a partial enlarged view of a framed part I in FIG. 30, wherein the mating backplane connector and the backplane connector are plugged in place.
Figure 32:
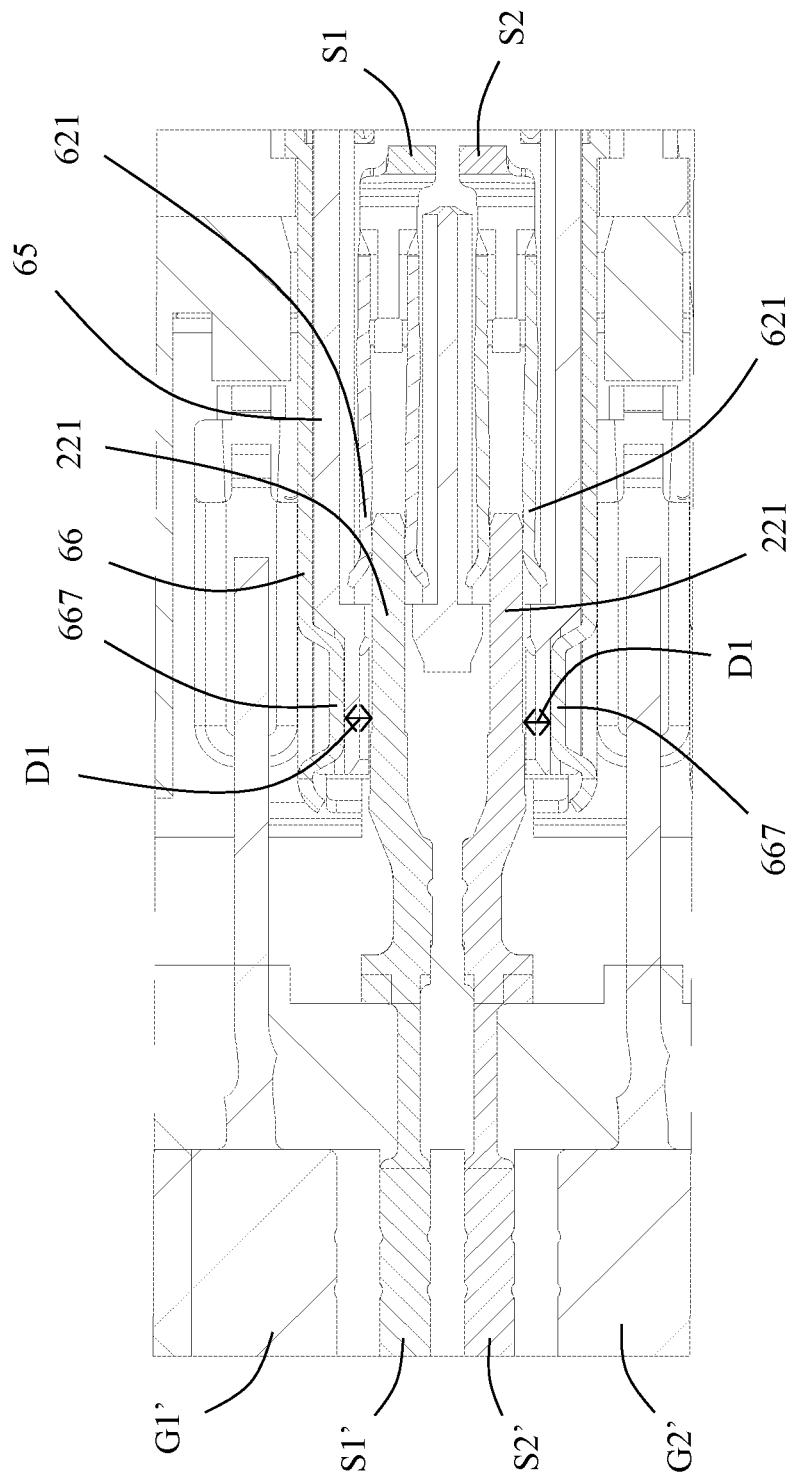
FIG. 32 is a partial enlarged view of FIG. 31 in another state where the mating backplane connector and the backplane connector are plugged but not in place.

Referring to FIGS. 30 to 32, in actual use, the mating backplane connector 100 and the backplane connector 200 may have various mating states, such as plugged in place and plugged but not in place, and the performance of the connector is also based on the performance of the various mating states.

Referring to FIG. 32, in the illustrated embodiment of the present disclosure, when the mating backplane connector 100 and the backplane connector 200 are in a state where the mating backplane connector 100 and the backplane connector 200 are plugged but not in place, a distance between the protrusion 667 of the metal shield surrounding member 66 and the first connecting portion 225a or the second connecting portion 225b of an adjacent mating conductive terminal 22 is D1. The effect of stable impedance in this state can be achieved by adjusting the value of D1. It should be noted that the technical term "plugged but not in place" used in the present disclosure refers to the contacting state where the mating conductive terminals 22 of the mating backplane connector 100 are in contact with the conductive terminals 62 of the backplane connector 200, but have not reached the final contact position.

Referring to FIG. 31, in the illustrated embodiment of the present disclosure, when the mating backplane connector 100 and the backplane connector 200 are plugged in place, a distance between the protrusion 667 of the metal shield surrounding member 66 and the first connecting portion 225a or the second connecting portion 225b of an adjacent mating conductive terminal 22 is D2. The value of D2 can be determined according to the actual situation so as to achieve the effect of stable impedance in this state. In other words, by providing the first recess 225a1 and the second recess 225b1, the value of D2 can be better adjusted. As a result, it is possible to achieve the effect of stabilizing impedance no matter when the mating backplane connector 100 and the backplane connector 200 are plugged in place or plugged but not in place.

In a related design where the first recess 225a1 and the second recess 225b1 are not provided, if this related design is to meet the requirement of the distance D1 when the mating backplane connector 100 and the backplane connector 200 are plugged but not in place, the distance D2 when the mating backplane connector 100 and the backplane connector 200 are plugged in place is necessarily too short, which is not beneficial to achieve the effect of impedance stabilization. Similarly, if this related design is to meet the requirement of the distance D2 when the mating backplane connector 100 and the backplane connector 200 are plugged in place, the distance D1 when the mating backplane connector 100 and the backplane connector 200 are plugged but not in place is necessarily too short, which is not beneficial to achieve the effect of impedance stabilization.

Based on a lot of research and experiments, the inventors of the present disclosure found that the shortest distance between the metal shield surrounding member 66 and the mating conductive terminal 22 has an important effect on impedance stability. Compared with the prior art, by providing the first recess 225a1 and the second recess 225b1 in the present disclosure, it is able to maintain the distances D1, D2 within a proper value range when the mating backplane connector 100 and the backplane connector 200 are plugged in place and plugged but not in place. The distances D1, D2 are neither too large nor too small, so that the effect of impedance stabilization can be achieved.

The above embodiments are only used to illustrate the present disclosure and not to limit the technical solutions described in the present disclosure. The understanding of this specification should be based on those skilled in the art. Descriptions of directions, although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. A mating terminal module, comprising:
    a plurality of mating conductive terminals, each mating conductive terminal comprising a mating portion and an intermediate portion, the mating conductive terminals comprising mating differential signal terminals, a first mating ground terminal and a second mating ground terminal, the mating differential signal terminals being located between the first mating ground terminal and the second mating ground terminal, the mating differential signal terminals comprising a first mating signal terminal and a second mating signal terminal; the mating portions of the first mating signal terminal and the second mating signal terminal being needle-shaped and rigid; the mating portions of the first mating ground terminal and the second mating ground terminal being plate-shaped and rigid; and
    an insulating support frame, the intermediate portions of the mating conductive terminals being fixed to the insulating support frame, the insulating support frame comprising a hollow portion, the intermediate portions of the mating conductive terminals being partially exposed to the hollow portion;
    wherein the first mating signal terminal further comprises a first connecting portion connecting the mating portion of the first mating signal terminal and the intermediate portion of the first mating signal terminal; and wherein the mating portion and the first connecting portion of the first mating signal terminal protrude beyond the insulating support frame;
    wherein the second mating signal terminal further comprises a second connecting portion connecting the mating portion of the second mating signal terminal and the intermediate portion of the second mating signal terminal; and wherein the mating portion and the second connecting portion of the second mating signal terminal protrude beyond the insulating support frame; and
    wherein the first connecting portion extends from one end of the mating portion of the first mating signal terminal toward the second connecting portion; and the second connecting portion extends from one end of the mating portion of the second mating signal terminal toward the first connecting portion;
    the intermediate portion of the first mating ground terminal, the intermediate portion of the first mating signal terminal, the intermediate portion of the second mating signal terminal and the intermediate portion of the second mating ground terminal are located in a same first plane;
    the first mating ground terminal comprises such a first torsion portion connecting the mating portion of the first mating ground terminal and the intermediate portion of the first mating ground terminal that the mating portion of the first mating ground terminal is located in a second plane perpendicular to the first plane;
    the second mating ground terminal comprises such a second torsion portion connecting the mating portion of the second mating ground terminal and the intermediate portion of the second mating ground terminal that the mating portion of the second mating ground terminal is located in a third plane perpendicular to the first plane; the second plane and the third plane are parallel to each other.

2. The mating terminal module according to claim 1, wherein the intermediate portion of the first mating signal terminal comprises a first straight portion connected to the first connecting portion, and the first straight portion is parallel to the mating portion of the first mating signal terminal;
    wherein the intermediate portion of the second mating signal terminal comprises a second straight portion connected to the second connecting portion, and the second straight portion is parallel to the mating portion of the second mating signal terminal; and
    wherein a distance between the first straight portion and the second straight portion is smaller than a distance between the mating portion of the first mating signal terminal and the mating portion of the second mating signal terminal.

3. The mating terminal module according to claim 2, wherein the first straight portion and the second straight portion are located in the insulating support frame.

4. The mating terminal module according to claim 1, wherein
    a wide surface of the mating portion of the first mating ground terminal is opposite to a wide surface of the mating portion of the second mating ground terminal; the mating portion of the first mating signal terminal and the mating portion of the second mating signal terminal are located between the mating portion of the first mating ground terminal and the mating portion of the second mating ground terminal.

5. The mating terminal module according to claim 4, wherein a narrow surface of the intermediate portion of the first mating ground terminal is opposite to a narrow surface of the intermediate portion of the second mating ground terminal.

6. The mating terminal module according to claim 1, wherein the first connecting portion comprises a first recess recessed toward the second mating signal terminal, the first connecting portion is arc-shaped, and the first recess is an arc-shaped recess formed by bending the first connecting portion itself, and
    wherein the second connecting portion comprises a second recess recessed toward the first mating signal terminal, the second connecting portion is arc-shaped, and the second recess is an arc-shaped recess formed by bending the second connecting portion itself.

7. The mating terminal module according to claim 1, wherein the first connecting portion comprises a first recess recessed toward the second mating signal terminal, and the first recess is a cutout formed by cutting the first connecting portion; and wherein the second connecting portion comprises a second recess recessed toward the first mating signal terminal, and the second recess is a cutout formed by cutting the second connecting portion.

8. The mating terminal module according to claim 1, wherein a distance between the first connecting portion and the second connecting portion is smaller than a distance between the mating portion of the first mating signal terminal and the mating portion of the second mating signal terminal.

9. A mating backplane connector, comprising:

a mating header, the mating header comprising a mating surface and a plurality of terminal receiving grooves extending through the mating surface; and a plurality of mating terminal modules, the mating terminal modules being assembled to the mating header, each mating terminal module comprising:

a plurality of mating conductive terminals, each mating conductive terminal comprising a mating portion and an intermediate portion, the mating conductive terminals comprising mating differential signal terminals, a first mating ground terminal and a second mating ground terminal, the mating differential signal terminals being located between the first mating ground terminal and the second mating ground terminal, the mating differential signal terminals comprising a first mating signal terminal and a second mating signal terminal; the mating portions of the first mating signal terminal and the second mating signal terminal being needle-shaped and rigid; the mating portions of the first mating ground terminal and the second mating ground terminal being plate-shaped and rigid; and an insulating support frame, the intermediate portions of the mating conductive terminals being fixed to the insulating support frame, the insulating support frame comprising a hollow portion, the intermediate portions of the mating conductive terminals being partially exposed to the hollow portion;

wherein the first mating signal terminal further comprises a first connecting portion connecting the mating portion of the first mating signal terminal and the intermediate portion of the first mating signal terminal; and wherein the mating portion and the first connecting portion of the first mating signal terminal protrude beyond the insulating support frame;

wherein the second mating signal terminal further comprises a second connecting portion connecting the mating portion of the second mating signal terminal and the intermediate portion of the second mating signal terminal; and wherein the mating portion and the second connecting portion of the second mating signal terminal protrude beyond the insulating support frame; and wherein the first connecting portion extends from one end of the mating portion of the first mating signal terminal toward the second connecting portion; and the second connecting portion extends from one end of the mating portion of the second mating signal terminal toward the first connecting portion;

the intermediate portion of the first mating ground terminal, the intermediate portion of the first mating signal terminal, the intermediate portion of the second mating signal terminal and the intermediate portion of the second mating ground terminal are located in a same first plane;

the first mating ground terminal comprises such a first torsion portion connecting the mating portion of the first mating ground terminal and the intermediate portion of the first mating ground terminal that the mating portion of the first mating ground terminal is located in a second plane perpendicular to the first plane;

the second mating ground terminal comprises such a second torsion portion connecting the mating portion of the second mating ground terminal and the intermediate portion of the second mating ground terminal that the mating portion of the second mating ground terminal is located in a third plane perpendicular to the first plane; the second plane and the third plane are parallel to each other.

10. The mating backplane connector according to claim 9, wherein the intermediate portion of the first mating signal terminal comprises a first straight portion connected to the first connecting portion, and the first straight portion is parallel to the mating portion of the first mating signal terminal;

wherein the intermediate portion of the second mating signal terminal comprises a second straight portion connected to the second connecting portion, and the second straight portion is parallel to the mating portion of the second mating signal terminal; and wherein a distance between the first straight portion and the second straight portion is smaller than a distance between the mating portion of the first mating signal terminal and the mating portion of the second mating signal terminal.

11. The mating backplane connector according to claim 9, wherein a wide surface of the mating portion of the first mating ground terminal is opposite to a wide surface of the mating portion of the second mating ground terminal; the mating portion of the first mating signal terminal and the mating portion of the second mating signal terminal are located between the mating portion of the first mating ground terminal and the mating portion of the second mating ground terminal.

12. The mating backplane connector according to claim 11, wherein a narrow surface of the intermediate portion of the first mating ground terminal is opposite to a narrow surface of the intermediate portion of the second mating ground terminal.

13. A backplane connector assembly, comprising:

a backplane connector, comprising:

a header, the header defining a receiving space; and a plurality of terminal modules, the terminal modules being assembled to the header, each terminal module comprising:

a plurality of conductive terminals, each conductive terminal comprising a contact portion and a connection portion, the conductive terminals comprising differential signal terminals, a first ground terminal and a second ground terminal, the differential signal terminals being located between the first ground terminal and the second ground terminal; the contact portion of each of the differential signal terminals being elastic and defining a first clamping space;

an insulating frame, the connection portions of the conductive terminals being fixed to the insulating frame, the insulating frame comprising a hollow portion, the connection portions of the conductive terminals being partially exposed to the hollow portion;

an insulating block, the insulating block being sleeved on the contact portion of the first signal terminal and the contact portion of the second signal terminal; and a metal shield surrounding member, the metal shield surrounding member being sleeved on the insulating block, the metal shield surrounding member comprising a protrusion formed inwardly; and a mating backplane connector mateable with the backplane connector, the mating backplane connector comprising:

a mating header, the mating header comprising a mating surface and a terminal receiving groove extending through the mating surface, the mating header being at least partially received in the receiving space, the metal shield surrounding member being inserted into the terminal receiving groove; and a plurality of mating terminal modules, the mating terminal modules being assembled to the mating header, each mating terminal module comprising:

a plurality of mating conductive terminals, each mating conductive terminal comprising a mating portion and an intermediate portion, the mating conductive terminals comprising mating differential signal terminals, a first mating ground terminal and a second mating ground terminal, the mating differential signal terminals being located between the first mating ground terminal and the second mating ground terminal, the mating differential signal terminals comprising a first mating signal terminal and a second mating signal terminal; the mating portions of the first mating signal terminal and the second mating signal terminal being needle-shaped and rigid; the mating portions of the mating differential signal terminals being configured to be inserted into the first clamping spaces of the differential signal terminals; the mating portions of the first mating ground terminal and the second mating ground terminal being plate-shaped and rigid; and an insulating support frame, the intermediate portions of the mating conductive terminals being fixed to the insulating support frame, the insulating support frame comprising a hollow portion, the intermediate portions of the mating conductive terminals being partially exposed to the hollow portion;

wherein the first mating signal terminal further comprises a first connecting portion connecting the mating portion of the first mating signal terminal and the intermediate portion of the first mating signal terminal; and wherein the mating portion and the first connecting portion of the first mating signal terminal protrude beyond the insulating support frame;

wherein the second mating signal terminal further comprises a second connecting portion connecting the mating portion of the second mating signal terminal and the intermediate portion of the second mating signal terminal; and wherein the mating portion and the second connecting portion of the second mating signal terminal protrude beyond the insulating support frame; and wherein the first connecting portion extends from one end of the mating portion of the first mating signal terminal toward the second connecting portion; and the second connecting portion extends from one end of the mating portion of the second mating signal terminal toward the first connecting portion.

14. The backplane connector assembly according to claim 13, wherein the intermediate portion of the first mating signal terminal comprises a first straight portion connected to the first connecting portion, and the first straight portion is parallel to the mating portion of the first mating signal terminal;

wherein the intermediate portion of the second mating signal terminal comprises a second straight portion connected to the second connecting portion, and the second straight portion is parallel to the mating portion of the second mating signal terminal; and wherein a distance between the first straight portion and the second straight portion is smaller than a distance between the mating portion of the first mating signal terminal and the mating portion of the second mating signal terminal.

15. The backplane connector assembly according to claim 13, wherein the first mating ground terminal comprises a first torsion portion connecting the mating portion of the first mating ground terminal and the intermediate portion of the first mating ground terminal;

wherein the second mating ground terminal comprises a second torsion portion connecting the mating portion of the second mating ground terminal and the intermediate portion of the second mating ground terminal; and wherein a wide surface of the mating portion of the first mating ground terminal is opposite to a wide surface of the mating portion of the second mating ground terminal; the mating portion of the first mating signal terminal and the mating portion of the second mating signal terminal are located between the mating portion of the first mating ground terminal and the mating portion of the second mating ground terminal.

16. The backplane connector assembly according to claim 15, wherein the intermediate portion of the first mating ground terminal and the intermediate portion of the second mating ground terminal are located in a first plane, and a narrow surface of the intermediate portion of the first mating ground terminal is opposite to a narrow surface of the intermediate portion of the second mating ground terminal; and wherein the mating portion of the first mating ground terminal and the mating portion of the second mating ground terminal are respectively located in second planes which are perpendicular to the first plane.

17. The backplane connector assembly according to claim 13, wherein a distance between the first connecting portion and the second connecting portion is smaller than a distance between the mating portion of the first mating signal terminal and the mating portion of the second mating signal terminal.

18. The backplane connector assembly according to claim 13, wherein when the mating backplane connector and the backplane connector are plugged but not in place, the protrusion of the metal shield surrounding member corresponds to the mating portion of the mating conductive terminal which is located adjacent to the protrusion.

19. The backplane connector assembly according to claim 13, wherein when the mating backplane connector and the backplane connector are plugged in place, the protrusion of the metal shield surrounding member corresponds to the first recess or the second recess of the mating conductive terminal which is located adjacent to the protrusion.

20. The backplane connector assembly according to claim 13, wherein the intermediate portion of the first mating ground terminal, the intermediate portion of the first mating signal terminal, the intermediate portion of the second mating signal terminal and the intermediate portion of the second mating ground terminal are located in a same first plane;
  the first mating ground terminal comprises such a first torsion portion connecting the mating portion of the first mating ground terminal and the intermediate portion of the first mating ground terminal that the mating portion of the first mating ground terminal is located in a second plane perpendicular to the first plane;
  the second mating ground terminal comprises such a second torsion portion connecting the mating portion of the second mating ground terminal and the intermediate portion of the second mating ground terminal that the mating portion of the second mating ground terminal is located in a third plane perpendicular to the first plane;
  the second plane and the third plane are parallel to each other.

* * * * *